(12) United States Patent
Kuroda et al.

(10) Patent No.: US 7,768,899 B2
(45) Date of Patent: Aug. 3, 2010

(54) OPTICAL RECORDING MEDIUM HAVING MANAGEMENT AREA FOR REPLICATING PRE-RECORD FLAG

(75) Inventors: Kazuo Kuroda, Tokorozawa (JP); Eiji Muramatsu, Tokorozawa (JP); Masahiro Kato, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 843 days.

(21) Appl. No.: 11/659,081

(22) PCT Filed: Aug. 1, 2005

(86) PCT No.: PCT/JP2005/041044

§ 371 (c)(1),
(2), (4) Date: Feb. 1, 2007

(87) PCT Pub. No.: WO2006/013823

PCT Pub. Date: Feb. 9, 2006

(65) Prior Publication Data

US 2008/0310290 A1 Dec. 18, 2008

(30) Foreign Application Priority Data

Aug. 3, 2004 (JP) .............................. 2004-226721

(51) Int. Cl.
*G11B 7/24* (2006.01)
(52) U.S. Cl. .................................................. 369/275.3
(58) Field of Classification Search ............... 369/275.3, 369/275.2, 275.1, 275.4; 428/64.1; 430/321, 430/270.11, 270.13
See application file for complete search history.

(56) References Cited

U.S. PATENT DOCUMENTS

| 2003/0103431 | A1 | 6/2003 | Kuroda |
| 2004/0174793 | A1 | 9/2004 | Park et al. |
| 2005/0237877 | A1 | 10/2005 | Yamanaka |
| 2007/0140098 | A1* | 6/2007 | Kuroda et al. ............ 369/275.3 |

FOREIGN PATENT DOCUMENTS

| EP | 1054399 | 11/2000 |
| EP | 1282128 | 2/2003 |
| EP | 1418583 | 5/2004 |
| JP | 2000-331412 | 11/2000 |
| JP | 2001-176079 | 6/2001 |
| JP | 2001-266362 | 9/2001 |
| JP | 2002-170339 | 6/2002 |
| JP | 2003-045117 | 2/2003 |
| JP | 2003-151133 | 5/2003 |
| JP | 2003-157620 | 5/2003 |
| JP | 2003-173528 | 6/2003 |
| WO | 02/17055 | 2/2002 |

\* cited by examiner

*Primary Examiner*—Tan X Dinh
(74) *Attorney, Agent, or Firm*—Young & Thompson

(57) ABSTRACT

An information recording medium (100) is provided with: a record information area (106) to record therein record information; an edge portion area (104, 108, 109) which is located in at least one edge portion of the record information area; and a flag area (121) to record therein a first pre-record flag for indicating whether or not predetermined pre-information is pre-recorded in at least one portion of the edge portion area.

8 Claims, 15 Drawing Sheets

FIG. 5
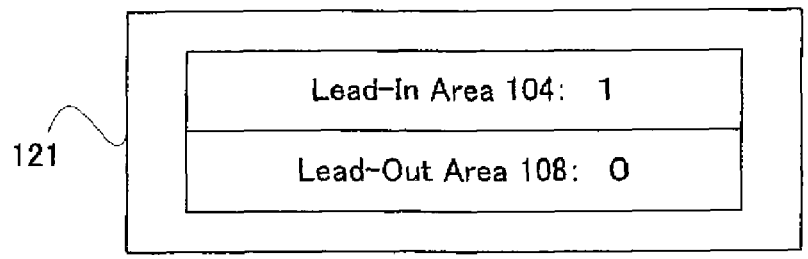
FIG. 5A
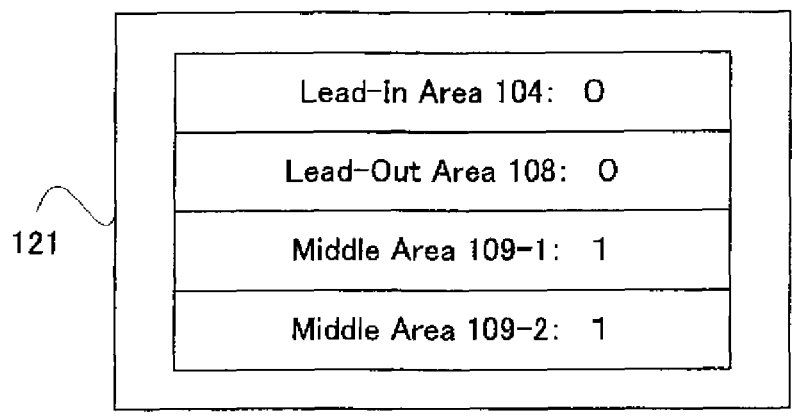
FIG. 5B
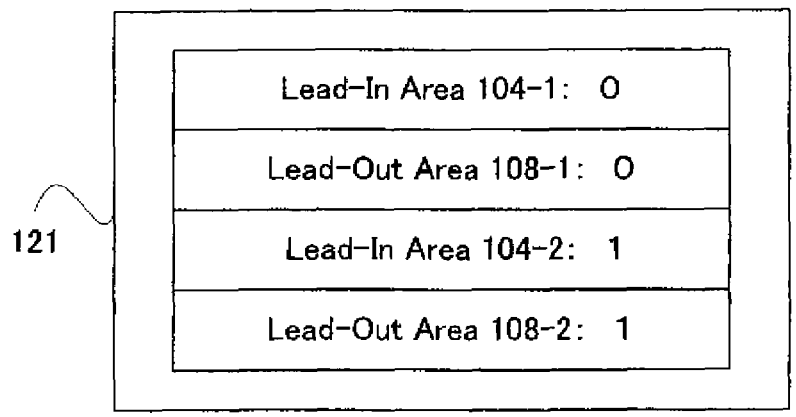
FIG. 5C

FIG. 8
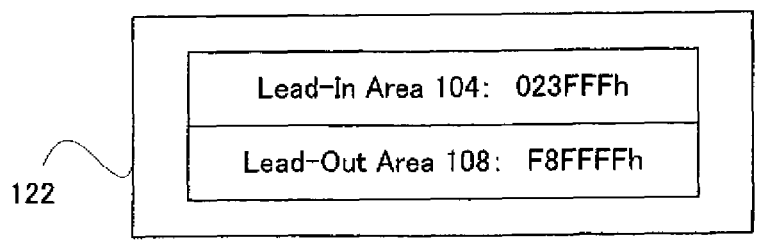
FIG. 8A
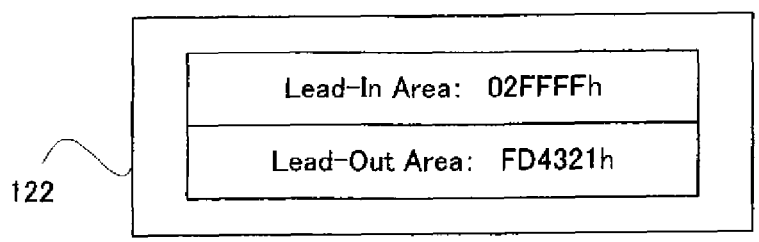
FIG. 8B
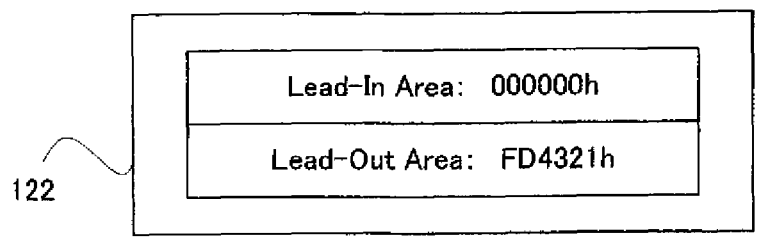
FIG. 8C
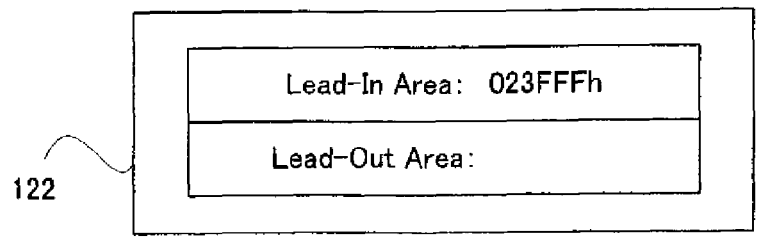
FIG. 8D FIG. 13
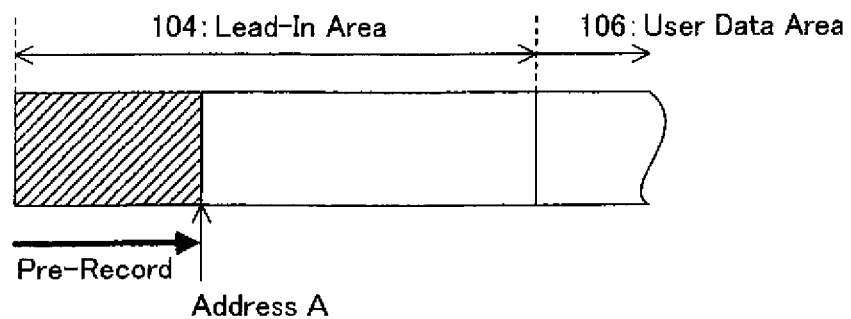
FIG. 13A
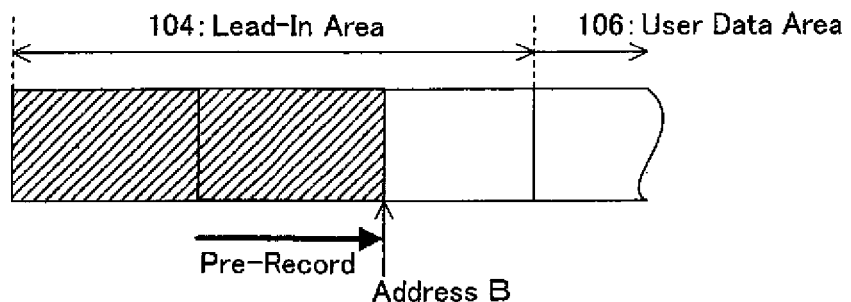
FIG. 13B
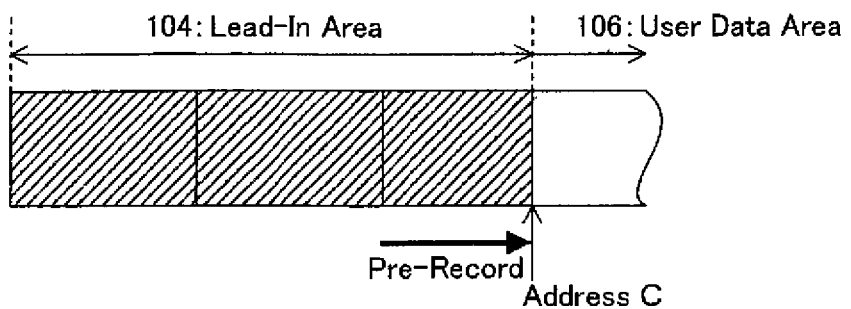
FIG. 13C

OPTICAL RECORDING MEDIUM HAVING MANAGEMENT AREA FOR REPLICATING PRE-RECORD FLAG

TECHNICAL FIELD

The present invention relates to an information recording medium, such as a DVD, an information recording apparatus, such as a DVD recorder, an information recording method, and a computer program which makes a computer as the information recording apparatus.

BACKGROUND ART

As described in Patent Documents 1 and 2, in an information recording medium, for example, such as a Compact Disc (CD) and a DVD, embossed pits or pre-marks are formed in advance in a necessity minimal area in a lead-in area, in order to prevent illegal copying and falsification of management information or control information.

Alternatively, as described in Patent Document 3, as for the recording operation of a multilayer optical disc, there is a technology of efficiently forming a buffer area for layer jump.

Moreover, as described in Patent Document 4, as for the recording operation of a single layer or multilayer optical disc, there is also a technology of controlling a recording apparatus to perform the recording operation at higher speed in the case of recording information into a lead-out area than in the case of recording information into a data area, in order to maintain compatibility with a Read Only Memory (ROM) disc and to reduce a time for recording the information into the lead-out area at the time of finalize processing.

Moreover, as described in Patent Document 5, there is also a technology of controlling the recording apparatus to perform the high-speed recording operation by changing the recording strategy of the recording laser in the case of recording the information into the lead-out area.

Furthermore, as described in Patent Document 6, there is a technology of minimizing the length of the lead-out area while maintaining compatibility with the ROM disc.

Patent document 1: Japanese Patent Application Laid Open NO. 2001-266362
Patent document 2: Japanese Patent Application Laid Open NO. 2000-331412
Patent document 3: Japanese Patent Application Laid Open NO. 2002-170339
Patent document 4: Japanese Patent Application Laid Open NO. 2001-176079
Patent document 5: Japanese Patent Application Laid Open NO. 2003-151133
Patent document 6: Japanese Patent Application Laid Open NO. 2003-157620

DISCLOSURE OF INVENTION

Subject to be Solved by the Invention

However, in the case of the single layer optical disc, it is only the lead-in area that its start position or the like is determined. Since a start position of the lead-out area cannot be determined, the embossed pits or the pre-marks cannot be formed in advance therein.

Moreover, as for the recording operation of the single layer or multilayer optical disc, sync information and address information are also recorded at the same time of the data recording in order to maintain compatibility with the general ROM disc, and the recording in the lead-out area is performed at the time of the finalize processing. Thus, there is such a technical problem that even if the length of the lead-out area is reduced or the high-speed recording is performed in the lead-out area, it is inevitable that it takes time to perform the recording in the lead-out area.

In addition, there is also such a technical problem that the advanced control of the recording apparatus is essential in order to make the length of the lead-out area variable and to perform the high-speed recording in the lead-out area.

It is therefore an object of the present invention to provide an information recording medium, an information recording apparatus, an information recording method, and a computer program, in which information can be efficiently recorded onto the information recording medium, for example, and which can reduce a recording time.

Means for Solving the Subject (Information Recording Medium)

The above object of the present invention can be achieved by an information recording medium provided with: a record information area to record therein record information; an edge portion area adjacent to at least one edge portion of the record information area; and a flag area to record therein a first pre-record flag for indicating whether or not predetermined pre-information is pre-recorded in at least one portion of the edge portion area.

According to the information recording medium of the present invention, it is possible to record the record information, such as video information, audio information and the like, into the record information area. Moreover, the edge portion area is located adjacent to one edge or both edges of the record information area.

The edge portion area is provided in order to prevent laser light from moving out of the record information area, which is one purpose, in searching over the recording surface of the information recording medium by an optical pickup of an information recording apparatus described later. Namely, if the structure of the edge portion area or the like is not provided, the laser light irradiated from the optical pickup may be out of the record information area. As a result, the information cannot be read by the irradiation of the laser light which may lead to the runaway of the subsequent operation of the optical pickup. However, if the edge portion area is provided and some information is recorded in the edge portion area, the above-mentioned disadvantage does not occur.

In particular, the information recording medium of the present invention is provided with the flag area to record therein the first pre-record flag for indicating whether or not the pre-information is pre-recorded in the edge portion area (or at least one portion thereof). The first pre-record flag particularly indicates whether or not the pre-information is pre-recorded by a user of the information recording medium of the present invention (or by an information recording apparatus owned by the user). Moreover, the pre-information is pre-recorded into an area portion of the edge portion area in which the pre-information is to be pre-recorded. For example, the pre-information is pre-recorded into a part or all of the area portion out of the edge portion area, to a degree in which the runaway of the operation of the optical pickup can be prevented, as described above, for example. Therefore, it is unnecessary to pre-record the pre-information over the entire edge portion area.

With respect to the information recording medium of the present invention, if the pre-information is pre-recorded in the edge portion area before the recording of the record information into the record information area, for example, it is unnecessary to record some information again into the edge portion area in the finalize processing. Namely, the pre-information can be pre-recorded into the edge portion area as the some information before the finalize processing, so that it is possible to reduce a time required for the finalize processing. As a result, it is possible to realize the recording operation, more efficiently. The fact that the pre-information is pre-recorded can be recognized owing to the first pre-record flag, relatively easily.

Consequently, according to the information recording medium of the present invention, it is possible to efficiently record the information onto the information recording medium, and it is possible to reduce a recording time.

The "pre-recording" herein indicates recording the pre-information before the finalize processing. In the actual pre-recording, the same operation is performed as the normal recording of the record information.

In one aspect of the information recording medium of the present invention, it is further provided with a position information area to record therein position information for indicating a position of an area portion of the edge portion area in which the pre-information is already pre-recorded.

According to this aspect, even if the pre-recording is stopped, it is possible to recognize a position where the pre-recording is stopped, relatively easily. Therefore, it is unnecessary to pre-record the pre-information into the edge portion area at a time, it is possible to perform the pre-recording in a plurality of times stepwise in the case that it is convenient for the user and the information recording apparatus or the like. For example, if it is necessary to record the record information during the pre-recording of the pre-information or in the similar case, it is possible to record the position information (e.g. address information or the like) of the area portion in which the pre-information is already pre-recorded into the position information area. By referring to the position information, it is possible to preferably restart the pre-recording from the position indicated by the position information. By this, it is possible to perform the recording operation, more efficiently.

In another aspect of the information recording medium of the present invention, it is further provided with a position information area to record therein position information for indicating a position of an end-edge portion of an area portion of the edge portion area in which the pre-information is already pre-recorded.

According to this aspect, even if the pre-recording is stopped, it is possible to recognize a position where the pre-recording is stopped, relatively easily. Therefore, it is unnecessary to pre-record the pre-information into the edge portion area at a time, it is possible to perform the pre-recording in a plurality of times stepwise in the case that it is convenient for the user and the information recording apparatus or the like (e.g. a processing load is small) In particular, the position information of the end-edge portion of the area portion of the edge portion area in which the pre-information is already pre-recorded (e.g. a border portion of the recording area in which the pre-information is pre-recorded and the recording area in which the pre-information is not pre-recorded) is recorded, so that it is possible to preferably restart the pre-recording of the pre-information from the position where the pre-recording is stopped, which is indicated by the position information. By this, it is possible to perform the recording operation, more efficiently.

In another aspect of the information recording medium of the present invention, the flag area is located in a recording management area to which a second pre-record flag is copied or in vicinity of the recording management area, the second pre-record flag indicating whether or not the pre-information is pre-recorded by a manufacturer of the information recording medium According to this aspect, the flag area is located in the recording management area to which the second pre-record flag is copied. Therefore, the information recording apparatus, which refers to the first pre-record flag recorded in the flag area, can treat the flag without distinguishing that it is the first pre-record flag for indicating whether or not the pre-information is pre-recorded by the user or that it is a copy of the second pre-record flag for indicating whether or not the pre-information is pre-recorded by the manufacturer (or maker). Therefore, if the flag area is provided in this place, even the existing information recording apparatus can preferably read the first pre-record flag, which is an advantage. Obviously, it is possible to receive the above-mentioned benefits even if the flag area is located in vicinity of the recording management area.

In another aspect of the information recording medium of the present invention, the edge portion area is at least one of a lead-in area, a lead-out area, and a middle area, each of which is located in the at least one edge portion.

According to this aspect, it is possible to receive the above-mentioned benefits, with respect to the wide-spread optical disc, such as a DVD and a CD.

In another aspect of the information recording medium of the present invention, the information recording medium has a plurality of recording layers, each of which comprises the recoding information area and the edge portion area, and the flag area is provided for at least one of the plurality of recording layers.

By such construction, even if the plurality of recording layers are provided, it is unnecessary to provide the flag area for each recording layer. Namely, at least one flag area which is common in the plurality of recording layers may be provided for at least one recording layer. Thus, it is possible to make a recording capacity required for the provision of the flag area relatively small, and it is possible to efficiently use the recording capacity of the information recording medium as a whole.

(Information Recording Apparatus)

The above object of the present invention can be also achieved by an information recording apparatus for recording record information onto an information recording medium provided with: a record information area to record therein the record information; an edge portion area adjacent to at least one edge portion of the record information area; and a flag area to record therein a first pre-record flag for indicating whether or not predetermined pre-information is pre-recorded in at least one portion of the edge portion area (i.e. the above-mentioned information recording medium of the present invention (including its various aspects)), the information recording apparatus provided with: a pre-recording device for pre-recording the pre-information into at least one portion of the edge portion area before the recording of the record information; a flag recording device for recording the first pre-record flag for indicating whether or not the pre-information is pre-recorded by the pre-recording device, into the flag area; and an information recording device for recording the record information into the record information area.

According to the information recording apparatus of the present invention, by the operation of the pre-recording device, the pre-information is pre-recorded into at least one portion of the edge portion area (i.e. the area portion out of the edge portion area in which the pre-information is to be recorded). Then, if the pre-information is recorded into at least one portion of the edge portion area, by the operation of the flag recording device, the first pre-record flag is recorded into the flag area.

At this time, after the recording of the record information into the record information area by the operation of the information recording device is ended, the finalize processing is performed with respect to the information recording medium in order to ensure compatibility with an reproduction-only information reproducing apparatus. Namely, as described above, some information is recorded into the edge portion area. At this time, since the pre-information is pre-recorded in the edge portion area by the operation of the pre-recording device before the finalize processing, it is unnecessary to record some information into the edge portion area in the finalize processing. Alternatively, even if there is a need to record some information into the edge portion area, it is enough to record a relatively small size of information, as compared to the case where the pre-information is not pre-recorded at all. Therefore, it is possible to reduce a time required for the finalize processing, to thereby realize the efficient recording operation.

In addition, by the operation of the flag recording device, the first pre-record flag for indicating that the pre-information is pre-recorded in the edge portion area is recorded. Thus, by referring to the first pre-record flag, it is possible to recognize that the pre-information is pre-recorded in the edge portion area, relatively easily.

Consequently, according to the information recording apparatus of the present invention, it is possible to efficiently record the record information onto the information recording medium, and it is possible to reduce a recording time.

Incidentally, in response to the various aspects of the information recording medium of the present invention described above, the information recording apparatus of the present invention can adopt various aspects.

In one aspect of the information recording apparatus of the present invention, it is further provided with a position information recording device for recording position information for indicating a position of an area portion of the edge portion area in which the pre-information is already pre-recorded.

According to this aspect, even if the pre-recording is stopped, it is possible to recognize a position where the pre-recording is stopped, relatively easily. Therefore, it is unnecessary to pre-record the pre-information into the edge portion area at a time, it is possible to perform the pre-recording in a plurality of times stepwise in the case that it is convenient for the user and the information recording apparatus or the like. For example, if it is necessary to record the record information during the pre-recording of the pre-information or in the similar case, it is possible to record the position information (e.g. address information or the like) of the area portion in which the pre-information is already pre-recorded into the position information area by the operation of the position information recording device. By referring to the position information, it is possible to preferably restart the pre-recording from the position where the pre-recording is stopped. By this, it is possible to perform the recording operation, more efficiently.

In another aspect of the information recording apparatus of the present invention, it is further provided with a position information recording device for recording position information for indicating a position of an end-edge portion of an area portion of the edge portion area in which the pre-information is already pre-recorded.

According to this aspect, even if the pre-recording is stopped, it is possible to recognize a position where the pre-recording is stopped, relatively easily. Therefore, it is unnecessary to pre-record the pre-information into the edge portion area at a time, it is possible to perform the pre-recording in a plurality of times stepwise in the case that it is convenient for the user and the information recording apparatus or the like. In particular, the position information of the end-edge portion of the area portion of the edge portion area in which the pre-information is already pre-recorded (e.g. a border portion of the recording area in which the pre-information is pre-recorded and the recording area in which the pre-information is not pre-recorded) is recorded, so that it is possible to preferably restart the pre-recording of the pre-information from the position where the pre-recording is stopped, which is indicated by the position information. By this, it is possible to perform the recording operation, more efficiently.

In another aspect of the information recording apparatus of the present invention, it is further provided with a stopping device for stopping the pre-recording of the pre-information if the recording of the record information by the information recording device is started during the pre-recording of the pre-information by the pre-recording device, the pre-recording device restarting the pre-recording of the pre-information after the recording of the record information by the information recording device is ended.

According to this aspect, it is possible to stop the pre-recording of the pre-information depending on the recording of the record information. Therefore, it is possible to flexibly change the recording of the record information and the pre-recording of the pre-information, in accordance with the actual recording operation.

In another aspect of the information recording apparatus of the present invention, it is further provided with: a stopping device for stopping the pre-recording of the pre-information by the pre-recording device; and a verifying device for verifying the pre-information already pre-recorded after the stopping of the pre-recording by the stopping device.

According to this aspect, by verifying the pre-recorded pre-information (i.e. by reproducing the pre-information and measuring the reproduction quality thereof or the like), it is possible to adjust various parameters for the recording operation of the information recording apparatus, as occasion demands. Therefore, it is possible to realize the recording operation, more preferably.

In this aspect, the pre-recording device may restart the pre-recording of the pre-information after the verifying by the verifying device.

By such construction, it is possible to restart the pre-recording of the pre-information after the verifying. Therefore, even if the verifying is performed, it is possible to receive the same various benefits as those of the information recording apparatus in the present invention.

In another aspect of the information recording apparatus of the present invention, the flag recording device records the first pre-record flag for indicating that the pre-information is already pre-recorded, after the pre-recording of the pre-information is completed.

According to this aspect, the first pre-record flag for indicating that the pre-information is already pre-recorded is recorded into the flag area after the pre-recording of the pre-information in the edge portion area (particularly, in the entire area portion out of the edge portion area in which the pre-information is to be recorded) is completed (i.e. ended). Therefore, by referring to the first pre-record flag, it is possible to recognize not only that the pre-information is recorded but also whether or not the recording of the pre-information is completed.

In another aspect of the information recording apparatus of the present invention, the flag recording device records the first pre-record flag into a recording management area to which a second pre-record flag is copied or in vicinity of the recording management area, the second pre-record flag indicating whether or not the pre-information is pre-recorded by a manufacturer of the information recording medium.

According to this aspect, the first pre-record flag is recorded in the recording management area to which the second pre-record flag is copied. Therefore, the information recording apparatus can refer to the flag without distinguishing that it is the first pre-record flag for indicating whether or not the pre-information is pre-recorded by the user or that it is a copy of the second pre-record flag for indicating whether or not the pre-information is pre-recorded by the manufacturer (or maker). Therefore, if the first pre-record flag is recorded into this place, even the existing information recording apparatus can preferably read the flag area, which is an advantage. Obviously, it is possible to receive the above-mentioned benefits even if the first pre-record flag is recorded in vicinity of the recording management area.

In another aspect of the information recording apparatus of the present invention, the pre-recording device records the pre-information into at least one of a lead-in area, a lead-out area, and a middle area, each of which is located in the at least one edge portion as the edge portion area.

According to this aspect, it is possible to receive the above-mentioned benefits, with respect to the wide-spread optical disc, such as a DVD and a CD.

In another aspect of the information recording apparatus of the present invention, the information recording medium has a plurality of recording layers, each of which comprises the recoding information area and the edge portion area, and the flag recording device records the first pre-record flag into at least one of the plurality of recording layers.

According to this aspect, even if the plurality of recording layers are provided, it is unnecessary to provide the flag area for each recording layer. Namely, at least one flag area which is common in the plurality of recording layers may be provided for at least one recording layer. In other words, at least one first pre-record flag which is common in the plurality of recording layers may be recorded into at least one recording layer. Thus, it is possible to make a recording capacity required for recording of the first pre-recorded flag, relatively small, and it is possible to efficiently use the recording capacity of the information recording medium as a whole.

(Information Recording Method)

The above object of the present invention can be also achieved by an information recording method of recording record information onto an information recording medium provided with: a record information area to record therein the record information; an edge portion area adjacent to at least one edge portion of the record information area; and a flag area to record therein a first pre-record flag for indicating whether or not predetermined pre-information is pre-recorded in at least one portion of the edge portion area (i.e. the above-mentioned information recording medium of the present invention (including its various aspects)), the information recording method provided with: a pre-recording process of pre-recording the pre-information into at least one portion of the edge portion area before the recording of the record information; a flag recording process of recording the first pre-record flag for indicating whether or not the pre-information is pre-recorded by the pre-recording device, into the flag area; and an information recording process of recording the record information into the record information area.

According to the information recording method of the present invention, it is possible to receive the same benefits as those of the information recording apparatus of the present invention.

Incidentally, in response to the various aspects of the information recording apparatus of the present invention described above, the information recording method of the present invention can adopt various aspects.

(Computer Program)

The above object of the present invention can be also achieved by a computer program making a computer function as at least one portion of the information recording apparatus of the present invention (including its various aspects). Specifically, the computer program makes the computer function as at least one portion of the pre-recording device, the flag recording device, and the information recording device.

According to the computer program of the present invention, the information recording apparatus of the present invention can be embodied relatively readily, by loading the computer program from a recording medium for storing the computer program, such as a ROM (Read Only Memory), a CD-ROM (Compact Disc-Read Only Memory), a DVD-ROM (DVD Read Only Memory), a hard disk or the like, into the computer, or by downloading the computer program into the computer via a communication device.

Incidentally, in response to various aspects in the information recording apparatus of the present invention, the computer program of the present invention can also adopt various aspects.

The above object of the present invention can be also achieved by a computer program product in a computer-readable medium for tangibly embodying a program of instructions executable by a computer in the information recording apparatus of the present invention (including its various aspects), to make the computer function as at least one portion of the pre-recording device, the flag recording device, and the information recording device.

According to the computer program product of the present invention, the information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the information recording apparatus described above.

Incidentally, in response to various aspects in the information recording apparatus of the present invention, the computer program product of the present invention can also adopt various aspects.

The nature, utility, and further features of this invention will be more clearly apparent from the following detailed description with reference to preferred embodiments of the invention when read in conjunction with the accompanying drawings briefly described below.

As explained above, according to the information recording medium of the present invention, it is provided with the record information area, the edge portion area, and the flag area. Therefore, it is possible to efficiently record the information onto the information recording medium, and it is also possible to reduce a recording time.

According to the information recording apparatus of the present invention, it is provided with the pre-recording device, the flag recording device, and the information recording device. According to the information recording method of the present invention, it is provided with the pre-recording process, the flag recording process, and the information recording process. Therefore, it is possible to efficiently record the information onto the information recording medium, and it is also possible to reduce a recording time.

BRIEF DESCRIPTION OF DRAWINGS

FIGS. 5A-5C are data structure diagrams conceptually showing a user pre-flag recorded onto the optical disc according to the embodiment;

FIGS. 8A-8D are data structure diagrams conceptually showing address information recorded in an address recording area provided for the optical disc;

FIGS. 13A-13C are explanatory diagrams conceptually showing the state of the pre-recording of pre-information in the second recording operation;

DESCRIPTION OF REFERENCE CODES

Figure 1:
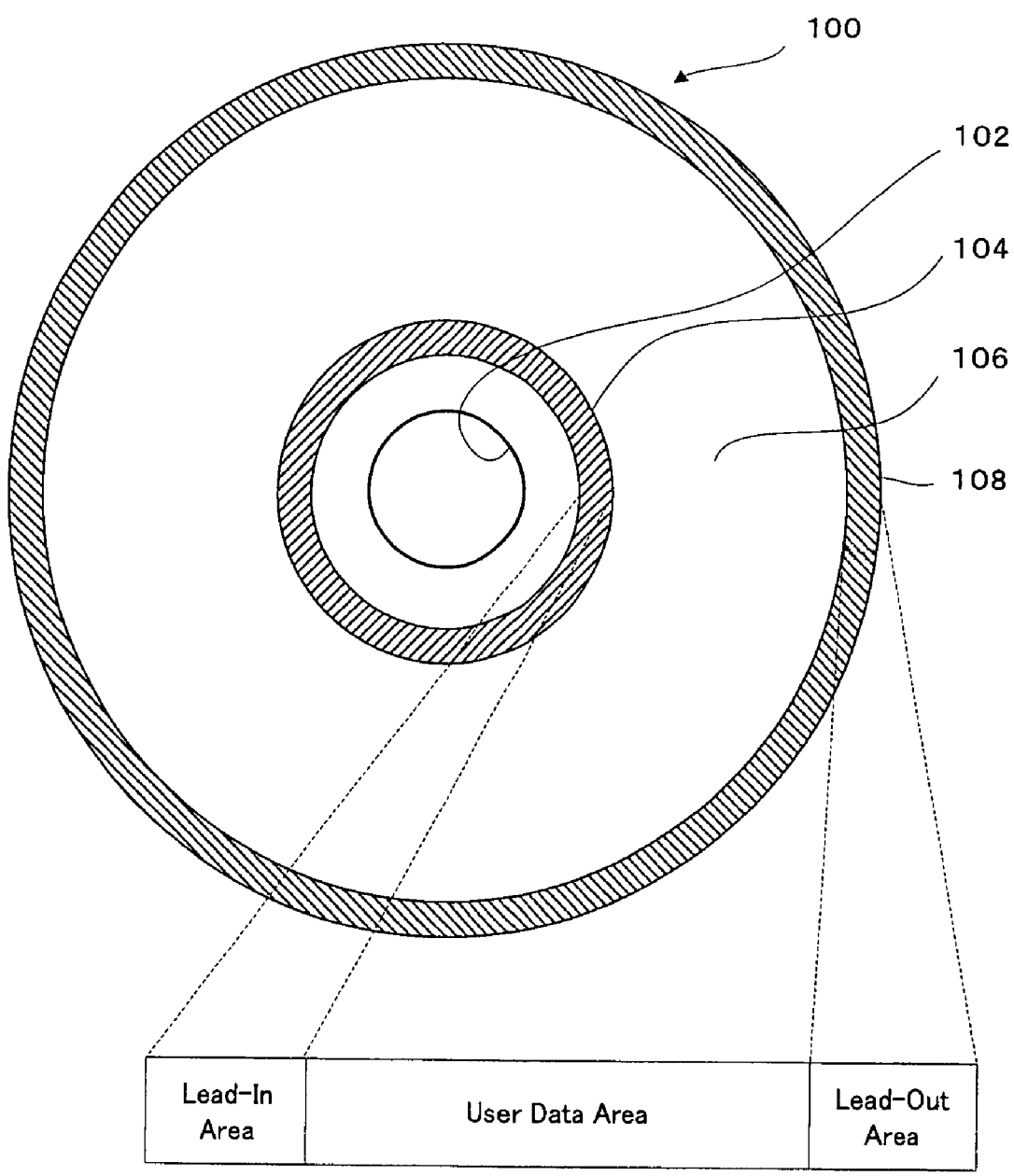
FIG. 1 are a substantial plan view showing the basic structure of an optical disc having a plurality of record areas in an embodiment of an information record medium of the present invention, and a schematic cross sectional view of the optical disc and a corresponding conceptual diagram showing a record area structure in the radial direction.

100 optical disc
104 lead-in area
106 user data area
108 lead-out area
109 middle area
112 RMA
113 control data zone
121 flag area
122 address recording area
300 information recording/reproducing apparatus
352 optical pick up
353 signal recording/reproducing device
354 CPU

BEST MODE FOR CARRYING OUT THE INVENTION

Hereinafter, the best mode for carrying out the present invention will be discussed in order for each embodiment, with reference to the drawings.

The embodiments of the present invention will be explained with reference to the drawings hereinafter.

(Information Recording Medium)

With reference to FIG. 1 to FIGS. 8A-8D, an information recording medium in an embodiment of the present invention will be explained.

(1) Basic Structure

At first, with reference to FIG. 1, the basic structure of an optical disc in the embodiment of the information record medium of the present invention will be explained. FIG. 1 shows the structure of an optical disc having a plurality of areas on the upper side in a substantial plan view in association with the structure of the areas in the radial direction on the lower side in a conceptual diagram.

As shown in FIG. 1, an optical disc 100 is recordable in various recoding methods, such as a magneto optical method and a phase changing method, in which it is possible to record (or write) data a plurality of times or only once. The optical disc 100 has a recording surface on the disc main body, which is about 12 cm in diameter, as is the DVD. On the recording surface, the optical disc 100 is provided with: a lead-in area 104; a user data area 106; and a lead-out area 108, with a center hole 102 as the center, in the direction from the inner circumference to the outer circumference. Incidentally, the user data area 106 constitutes one specific example of the "record information area" of the present invention, and the lead-in area 104 and the lead-out area 108 (or a middle area 109 described later) constitute one specific example of the "edge portion area" of the present invention. In each area, groove tracks GT and land tracks LT are alternately placed, spirally or coaxially, with the center hole 102 as the center, for example. These groove tracks GT may be wobbled, and pre-pits may be formed on either or both of the groove tracks GT and the land tracks LT.

Incidentally, the present invention is not specially limited to the optical disc having these three areas. For example, even if there is no lead-in area 104 nor lead-out area 108, a file structure described later can be constructed. Moreover, the lead-in area 104 and the lead-out area 108 may be further segmentalized.

Moreover, the optical disc 100 in the embodiment is not limited to an optical disc with one recording layer, but may be a two-layer single sided (i.e. a dual layer) disc or a two-layer double sided (i.e. a dual layer double sided) disc. Moreover, the optical disc 100 is not limited to an optical disc with two recording layers, but may be a multilayer optical disc with three or more recording layers.

(2) Data Structure

Figure 2:
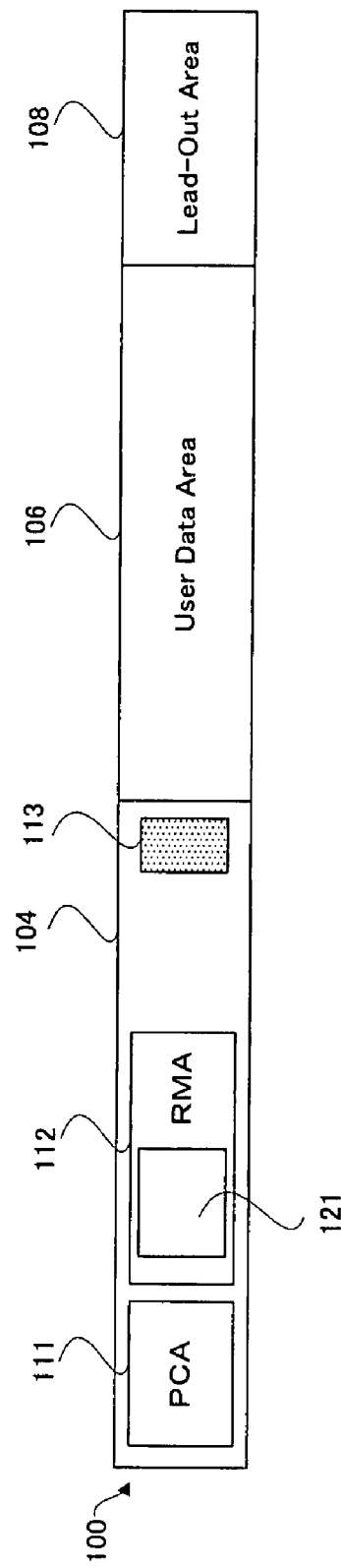
FIG. 2 is a data structure diagram conceptually showing a data structure related to an optical disc with one recording layer out of the optical discs according to the embodiment.
Figure 3:
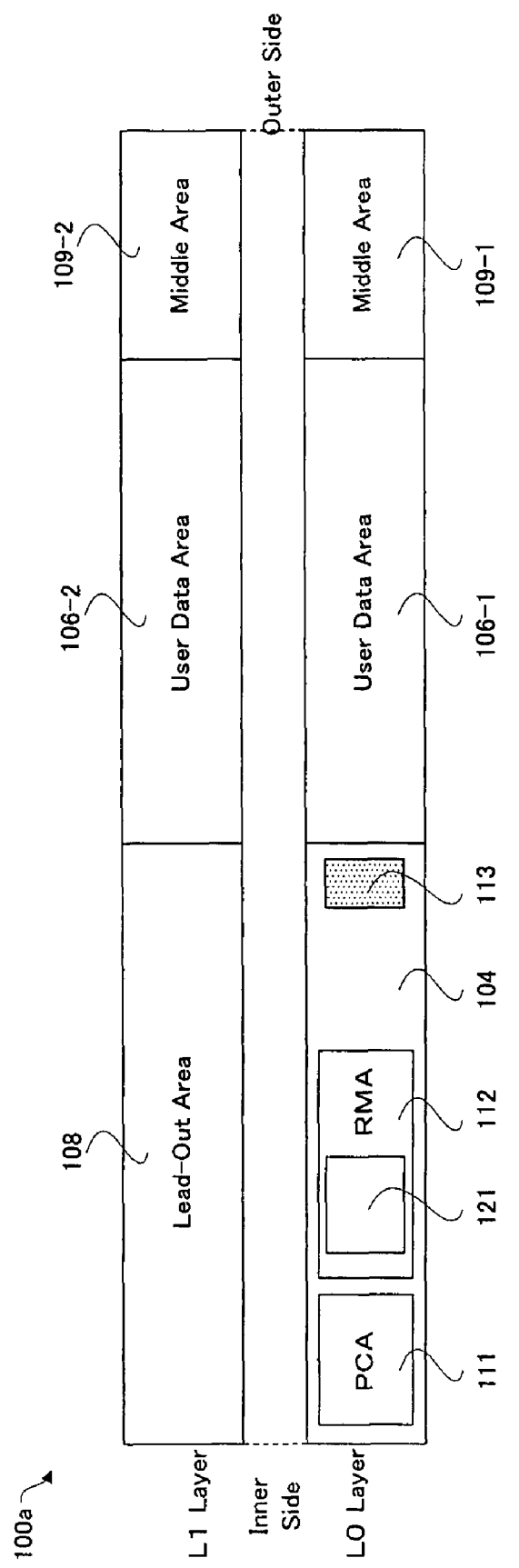
FIG. 3 is a data structure diagram conceptually showing one data structure related to an optical disc with two recording layers out of the optical discs according to the embodiment.
Figure 4:
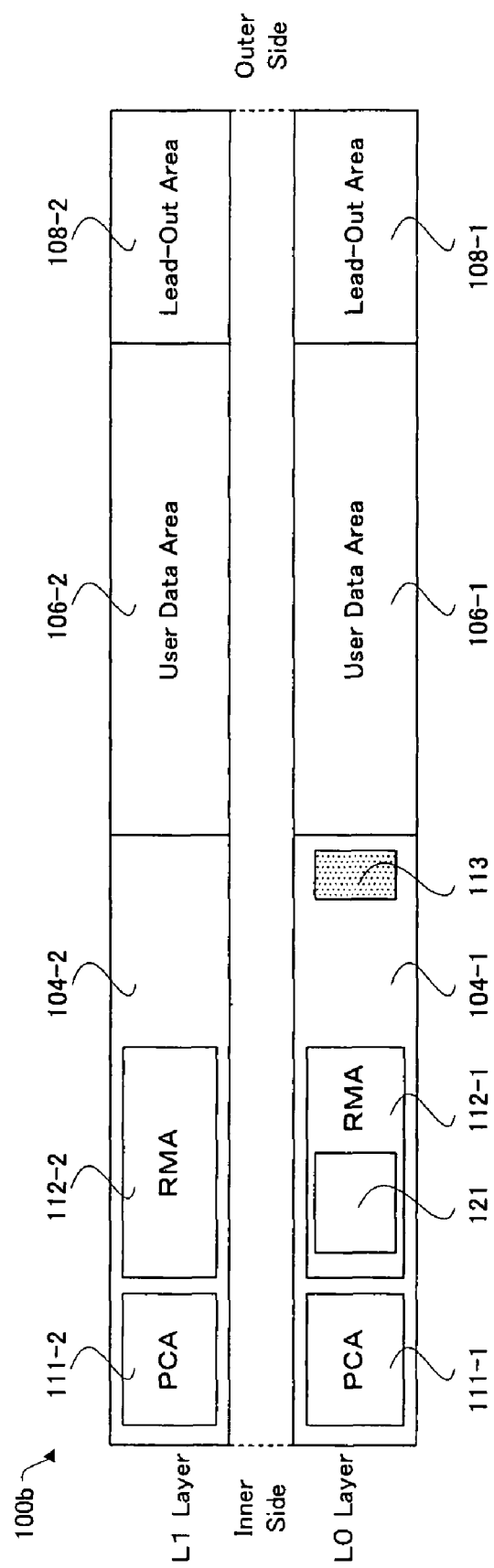
FIG. 4 is a data structure diagram conceptually showing another data structure related to the optical disc with two recording layers out of the optical discs according to the embodiment.

Next, with reference to FIG. 2 to FIG. 6, the specific data structure of the information recording medium in the embodiment will be explained. At first, the specific data structure will be explained with reference to FIG. 2 to FIG. 4, and then explained in more detail with reference to FIGS. 5A-5C and FIG. 6, as occasion demands. FIG. 2 conceptually shows a data structure related to an optical disc with one recording layer out of the optical discs according to the embodiment. FIG. 3 conceptually shows one data structure related to an optical disc with two recording layers out of the optical discs according to the embodiment. FIG. 4 conceptually shows another data structure related to the optical disc with two recording layers out of the optical discs according to the embodiment.

As shown in FIG. 2, in the lead-in area 104 of the optical disc 100, there are provided: a Power Calibration Area (PCA) 111; a Recording Management Area (RMA) 112; and a control data zone 113.

Into the PCA 111, an Optimum Power Control (OPC) pattern is recorded at the time of OPC processing. By reproducing the recorded OPC pattern, it is possible to calculate an optimum power in recording the data onto the optical disc 100.

Into the RMA 112, management information (RMD: Recording Management Data) is recorded, which is for managing a recording operation in recording predetermined data onto the optical disc 100. The RMA 112 constitutes one example of the "recording management area" of the present invention.

In particular, in the embodiment, the RMA 112 is provided with a flag area 121. Into the flag area 121, a user pre-flag is recorded, which indicates whether or not pre-data (e.g. "00h" data etc.) is pre-recorded in the lead-in area 104 and the lead-out area 108 (or the middle area 109 described later or one portion thereof). In particular, a user pre-flag for indicating whether or not the pre-data is recorded by a user of the optical disc 100 is recorded. Namely, the user pre-flag constitutes one specific example of the "first pre-record flag" of the present invention.

Into the control data zone 113, control data is recorded, which is for controlling a recording operation of the data onto the optical disc 100 or a reproduction operation of reproducing the data recorded on the optical disc 100. Moreover, a maker pre-flag is recorded by the manufacturer (i.e. disc maker) of the optical disc 100, which is for indicating whether or not the pre-data is pre-recorded in the lead-in area 104 and/or the lead-out area 108 (and/or the middle area 109 described later), as a manufacturer code, for example. The maker pre-flag constitutes one specific example of the "second pre-record flag" of the present invention. In the embodiment, the pre-data is not pre-recorded by the manufacturer in the lead-in area 104 and/or the lead-out area 108 or the like of the optical disc 100. Thus, the maker pre-flag shows "0", for example, which indicates that the pre-recording is not performed.

Then, the maker pre-flag is normally recorded into the RMA 112, particularly, at a recording position equal to the above-mentioned flag area 121, when the optical disc 100 is loaded onto an information recording/reproducing apparatus. Namely, the maker pre-flag recorded in the control data zone 113 at the time of factory shipment is copied (duplicated) into the RMA 112 at the time of loading. In other words, the flag area 121 in which the user pre-flag is recorded in the embodiment is normally located at the same recording position or substantially the same recording position as that of a copy destination to which the maker pre-flag is copied at the time of loading the optical disc.

Moreover, as for an optical disc 100a with two recording layers (i.e. the optical disc 100a of an opposite track pass type) out of the optical discs according to the embodiment, a L0 layer, which is the first recording layer, is provided with: a lead-in area 104; a user data area 104-1; and a middle area 109-1, in this order from the inner circumferential side to the outer circumferential side. A L1 layer, which is the second recording layer, is provided with: a lead-out area 108; a user data area 106-2; and a middle area 109-2, in this order from the inner circumferential side to the outer circumferential side. As with the optical disc 100, the lead-in area 104 of the L0 layer is provided with: a PCA 111; a RMA 112; and a control data zone 113, and moreover, the RMA 112 is provided with a flag area 121. A user pre-flag recorded into the flag area 121 of the optical disc 100a indicates whether or not pre-data is pre-recorded in the lead-in area 104, the lead-out area 108, the middle area 109-1, and/or the middle area 109-2 (or one portion thereof).

As for an optical disc 100b with two recording layers (i.e. the optical disc 100b of a parallel track pass type) out of the optical discs according to the embodiment, a L0 layer, which is the first recording layer, is provided with: a lead-in area 104-1; a user data area 104-1; and a lead-out area 108-1, in this order from the inner circumferential side to the outer circumferential side. A L1 layer, which is the second recording layer, is provided with: a lead-in area 104-2; a user data area 106-2; and a lead-out area 108-2, in this order from the inner circumferential side to the outer circumferential side. As with the optical disc 100b, the lead-in area 104-1 of the L0 layer is provided with: a PCA 111-1; a RMA 112-1; and a control data zone 113, and the lead-in are 104-2 of the L1 layer is provided with: a PCA 111-2; and a RMA 112-2. Moreover, the RMA 112-1 is provided with a flag area 121. A user pre-flag recorded into the flag area 121 of the optical disc 100b indicates whether or not pre-data is pre-recorded in the lead-in area 104-1, the lead-in area 104-2, the lead-out area 108-1, and/or the lead-out area 108-2 (or one portion thereof.

In the optical disc 100a and the optical disc 100b with the two recording layers, the flag area 121 may be provided for each of the recording layers.

The user pre-flag recorded into the flag area 121, which is provided for these optical discs 100, 100a, and 100b, will be specifically explained with reference to FIGS. 5A-5C. FIGS. 5A-5C conceptually show the user pre-flag recorded onto the optical disc according to the embodiment.

The user pre-flag is provided in each of the lead-in area 104, the lead-out area 108, and the middle area 109. For example, in the case of the optical disc 100 shown in FIG. 2, as shown in FIG. 5A, the user pre-flag including two flags is recorded into the flag area 121, wherein the two flags indicate whether or not the pre-data is pre-recorded in each of the lead-in area 104 and the lead-out area 108. If the flag for indicating whether or not the pre-data is pre-recorded in the lead-in area 104 shows "1", for example, the pre-data is recorded in the lead-in area 104 (particularly, the entire area portion in which the pre-data is to be recorded). On the other hand, if the flag for indicating whether or not the pre-data is pre-recorded in the lead-in area 108 shows "0", for example, the pre-data is not recorded in the lead-in area 108 (particularly, the entire area portion in which the pre-data is to be recorded).

In the case of the optical disc 100a shown in FIG. 3, as shown in FIG. 5B, the user pre-flag including four flags is recorded, wherein the four flags indicate whether or not the pre-data is pre-recorded in each of the lead-in area 104, the lead-out area 108, the middle area 109-1, and the middle area 109-2. In the case of the optical disc 100b shown in FIG. 4, as shown in FIG. 5C, the user pre-flag including four flags is recorded, wherein the four flags indicate whether or not the pre-data is pre-recorded in each of the lead-in area 104-1, the lead-out area 108-1, the lead-in area 104-2, and the lead-out area 108-2.

Incidentally, the lead-in area 104, the lead-out area 108, and the middle area 109 may be regarded as one recording area, and the user pre-flag for indicating whether or not the pre-data is recorded in the one recording area as a whole may be recorded.

As described above, the optical disc 100 or the like in the embodiment is provided with the flag area 121, and the user pre-flag is recorded in the flag area 121. Therefore, by referring to the user pre-flag, it is possible to recognize whether or not the pre-data is pre-recorded in the lead-in area 104 and the like, relatively easily. If the pre-data is pre-recorded in the lead-in area 104 and the like before (or while) recording content data or the like, which includes video data and audio data or the like, into the user data area 106, that can reduce a time required for the finalize processing of the optical disc 100 or the like. Namely, at the time of the finalize processing, it is required to record predetermined management data or dummy data (e.g. "00h" data etc.) into the lead-in area 104, the lead-out area 108, and the middle area 109, so that particularly, according to the embodiment, it is possible to reduce a time required for the recording of the dummy data.

Moreover, the flag area 121 is equal to the recording position of the copy destination to which the maker pre-flag is originally copied. Thus, loading the optical disc 100 even onto the existing information recording/reproducing apparatus does not cause a special disadvantage, which is greatly advantageous.

The pre-data does not always have to be recorded in the entire lead-in area 104. For example, the pre-data may not be recorded into a recording area where the predetermined management data or the like does not need to be recorded at the time of finalizing (e.g. an R information zone, an extra border zone, or the like). In this case, the user pre-flag indicates whether or not the pre-data is recorded in the lead-in area 104 except the recording area where the predetermined management data or the like does not need to be recorded at the time of finalizing. Obviously, the same is true for the lead-out area 108 and the middle area 109.

Figure 6:
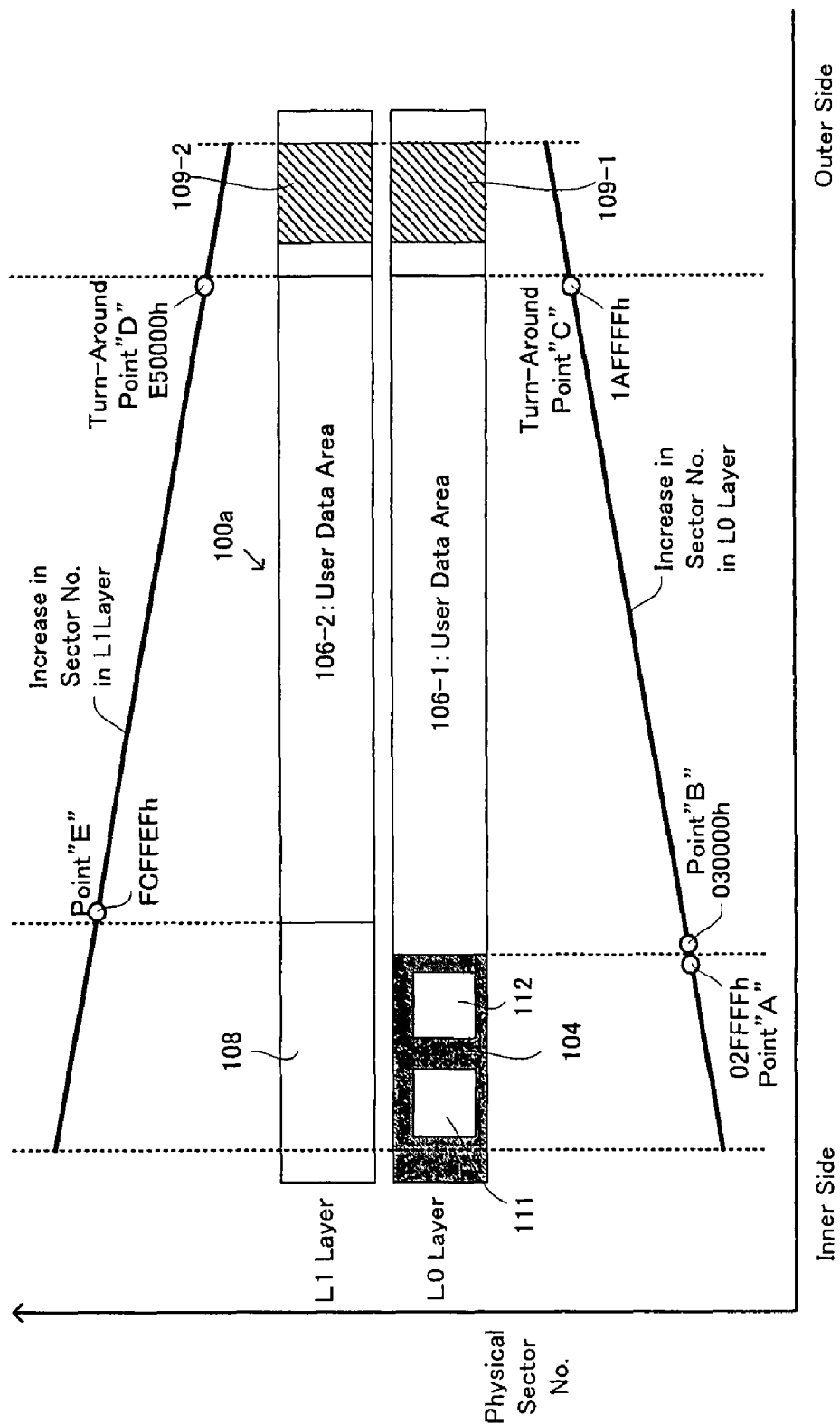
FIG. 6 is an explanatory diagram showing address information of the optical disc according to the embodiment.

Incidentally, the position of the lead-in area 104, the lead-out area 108, the middle area 109, or the like of the optical disc 100 or the like in the embodiment (i.e. the position of the recording area into which the pre-data is to be recorded) is recorded as address information, for example, by using a land pre pit. A specific explanation will be given with reference to FIG. 6. FIG. 6 shows the address information of the optical disc 100a shown in FIG. 3. The explanation will proceed by taking the optical disc 100a shown in FIG. 3 as an example.

As shown in FIG. 6, in the L0 layer, a sector number in the recording area of the optical disc 100 increases from the inner circumferential side to the outer circumferential side (i.e. in the order of the lead-in area 104, the user data area 106-1, and the middle area 109-1). The fact that the lead-in area 104 corresponds to a recording area with sector numbers equal to and less than "02FFFFh" is indicated by the land pre pit or the like, for example. Moreover, the fact that the middle area 109-1 corresponds to a recording area with sector numbers greater than "1AFFFFh" is indicated by the land pre pit or the like, for example. On the other hand, in the L1 layer, the sector number in the recording area of the optical disc 100 increases from the outer circumferential side to the inner circumferential side (i.e. in the order of the middle area 109-2, the user data area 106-2, and the lead-out area 108). The fact that the lead-out area 108 corresponds to a recording area with sector numbers greater than "FCFFEFh" is indicated by the land pre pit or the like, for example. Moreover, the fact that middle area 109-2 corresponds to a recording area with sector numbers less than "E50000h" is indicated by the land pre pit or the like, for example. Alternatively, the address information or the like for indicating a recording area into which the pre-data is to be recorded, more specifically, may be recorded by the land pre-pit or the like. The pre-data is pre-recorded into the lead-in area 104, the lead-out area 108 and the middle area 109 by an information recording/reproducing apparatus described later by obtaining the address information.

For reference, all the sector numbers in the L0 layer and the L1 layer explained above have a 15's complement number relationship in the hexadecimal notation. More specifically, a turn-around point in the L0 layer (sector number "1AFFFFh") and a turn-around point in the L1 layer (sector number "E50000h") have the 15's complement number relationship. As a formal matter, the complement number of the "1AFFFFh" is obtained by converting the sector number of "1AFFFFh" in the hexadecimal notation to a binary number of "000110101111111111111111", inverting the bits to "111001010000000000000000", and reconverting it to the "E50000h" in the hexadecimal notation. Moreover, with respect to the physical sector number, a Logical Block Address (LBA) is assigned, one to one. More specifically, for example, a LBA of "000000" corresponds to a sector number of "030000h", and a LBA of "30FFEF" corresponds to the sector number of "FCFFEFh". Thus, without aware of the physical sector number, a host computer can perform the recording operation and the reproduction operation in accordance with the logical block address LBA managed by a file system which is recorded near the border of the user data area 106 with the lead-in area 104.

(3) Modified Example

Figure 7:
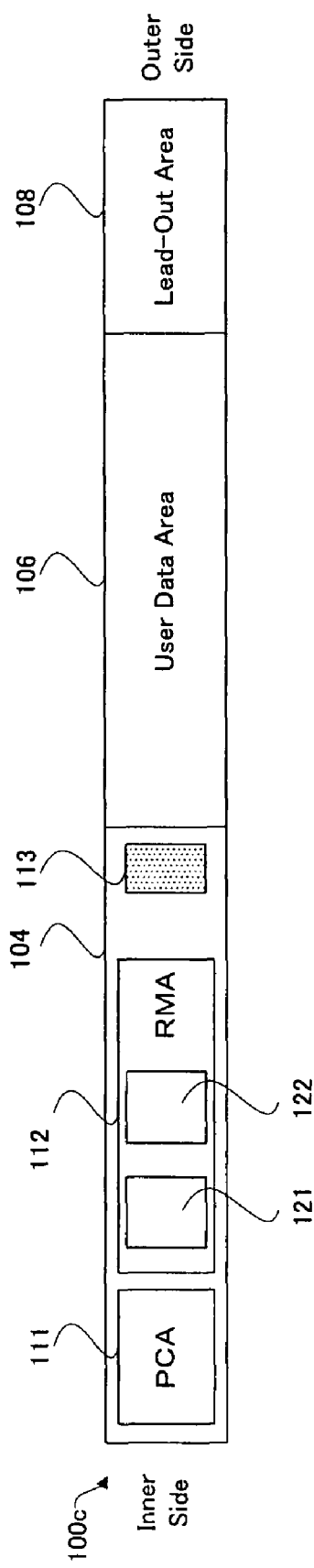
FIG. 7 is an explanatory diagram conceptually showing a specific data structure of an optical disc according to a modified example.

Next, with reference to FIG. 7 and FIGS. 8A-8D, the modified example of the information recording medium in the embodiment will be explained. FIG. 7 conceptually shows a specific data structure of an optical disc according to the modified example. FIGS. 8A-8D conceptually show the address information recorded in an address recording area provided for the optical disc according to the modified example.

As with the optical disc 100, in an optical disc 100c according to the modified example, the lead-in area 104 is provided with: a PCA 111; a RMA 112; and a control data zone 113. The RMA 112 is provided with a flag area 121.

In particular, in the optical disc 100c according to the modified example, the RMA 112 is further provided with an address recording area 122 which constitutes one specific example of the "position information area" of the present invention. Into the address recording area 122, the address information of the end-edge portion of a recording area in which the pre-data is already recorded in the lead-in area 104 is recorded. In other words, when the recording of the pre-data is stopped, the address information of a recording area in which the pre-data is finally recorded is recorded. Namely, for example, if the pre-data is already recorded in a recording area with sector numbers equal to and less than "023FFFh" in the lead-in area 104 and if the pre-data is not recorded yet in a recording area with sector numbers equal to and greater than "024000h", address information for indicating the sector number of "023FFFh" is recorded into the address recording area 122, as shown in FIG. 8A. Obviously, the same is true for the lead-out area 108 and the middle area 109. For example, if the pre-data is already recorded in a recording area with sector numbers equal to and less than "F8FFFFh" in the lead-out area 108 and if the pre-data is not recorded yet in a recording area with sector numbers equal to and greater than "F90000h", address information for indicating the sector number of "F8FFFFh" is recorded into the address recording area 122, as shown in FIG. 8A.

Moreover, if the pre-data is finally recorded in the entire recording area into which the pre-data is to be recorded in the lead-in area 104, for example, address information for indicating "02FFFFh" which is the sector number of the end-edge portion of the lead-in area 104 may be recorded in the address recording area 122, as shown in FIG. 8B. Alternatively, in this case, in order to indicate that the recording of the pre-data is ended (i.e. completed), address information for indicating a sector number of "000000h" may be recorded into the address recording area 122, as shown in FIG. 8C.

Moreover, if the pre-recording of the pre-data into the lead-out area 108 is not started yet, the address information about the lead-out area 108 may not recorded into the address recording area 122, as shown in FIG. 8D. It is obvious that the explanation shown in FIG. 8B to FIG. 8D can be applied to each of the lead-in area 104, the lead-out area 108, and the middle area 109.

As described above, by providing the address recording area 122 for recording therein the address information, in addition to the flag area 121 in which the user pre-flag is recorded, it is possible to recognize until which portion of the lead-in area 104 or the like the pre-data is pre-recorded, relatively easily. Therefore, it is possible to recognize whether or not the pre-recording of the pre-data is completed, relatively easily, to thereby record the pre-data, more efficiently. Moreover, even if the pre-recording of the pre-data is stopped in the middle, the address information for indicating the stopped position is recorded in the address recording area 122. Thus, even after stopping the pre-recording, it is possible to restart the pre-recording of the pre-data from the stopped position, relatively easily and quickly.

In the optical disc 100c provided with both the flag area 121 and the address recording area 122, if the pre-recording of the pre-data is completed, it is preferable to replace the user pre-flag, for example, from "0" to "1" and record it. Namely, if the pre-recording of the pre-data is stopped in the middle, it is preferable that the user pre-flag remains "0". Namely, the completion of the pre-recording of the pre-data corresponds to the case that the user pre-flag recorded in the flag area 121 is "1" and the address information recorded in the address recording area 122 indicates "000000h", as shown in FIG. 8B, or the sector number of the end-edge portion of the recording area in which the pre-data is to be pre-recorded, as shown in FIG. 8C.

In the modified example, the sector number is shown as one specific example of the address information recorded into the address recording area 122; however, the present invention is not limited to this. For example, the address information may be indicated by the above-mentioned logical block address, or by other information (e.g. a track number or the like). Moreover, the address information may be indicated by an absolute address value, or by a relative address value, such as an offset address, for example.

(Information Recording/Reproducing Apparatus)

Next, with reference to FIG. 9 to FIG. 15, an information recording/reproducing apparatus will be explained, which is an embodiment according to the information recording apparatus of the present invention.

(1) Basic Structure

Figure 9:
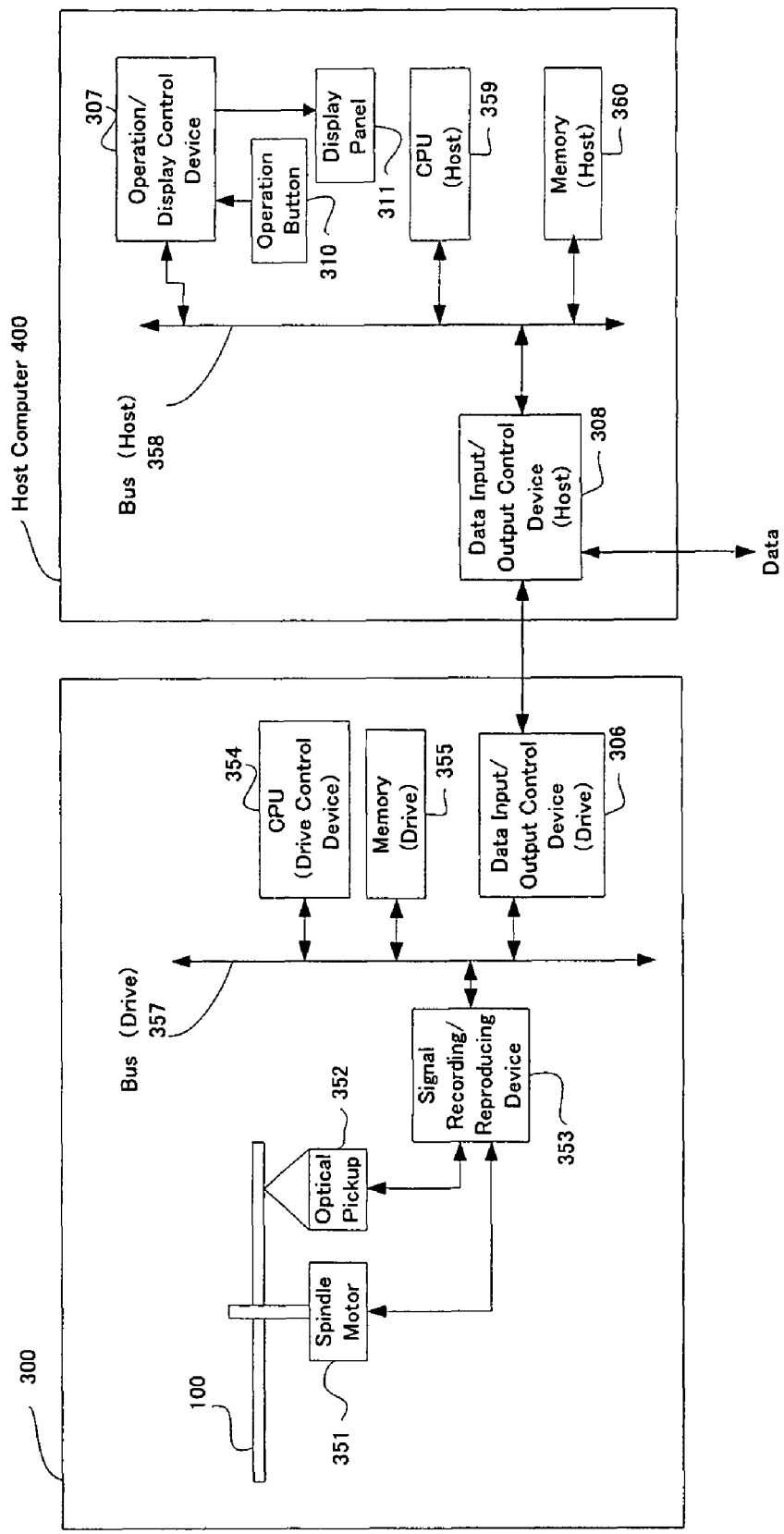
FIG. 9 is a block diagram showing an information recording/reproducing apparatus, as being an embodiment of an information recording apparatus of the present invention, and a host computer.

Firstly, with reference to FIG. 9, the structures of an information recording/reproducing apparatus 300 in the embodiment and a host computer 400 will be explained. FIG. 9 is a block diagram showing the information recording/reproducing apparatus in the embodiment and the host computer. Incidentally, the information recording/reproducing apparatus 300 has a function of recording the record data onto the optical disc 100 and a function of reproducing the record data recorded on the optical disc 100.

As shown in FIG. 9, the information recording/reproducing apparatus 300 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates in accessing the optical disc 100. More specifically, the spindle motor 351 is constructed to rotate and stop the optical disc 100 at a predetermined speed while receiving spindle servo, by a not-illustrated servo unit or the like.

The optical pickup 352 is provided with a semiconductor laser apparatus and a lens and the like in order to perform the recording/reproducing with respect to the optical disc 100. More specifically, the optical pickup 352 irradiates the optical disc 100 with laser light, as reading light with a first power upon reproduction, and as writing light with a second power with it modulated upon recording.

The signal recording/reproducing device 353 constitutes one specific example of the "pre-recording device", the "flag recording device", and the information "recording device" of the present invention, and performs the recording/reproducing with respect to the optical disc 100 by controlling the spindle motor 351 and the optical pickup 352. More specifically, the signal recording/reproducing device 353 is provided with a laser diode (LD) driver, a head amplifier, and the like. The LD driver drives the not-illustrated semiconductor laser apparatus built in the optical pickup 352. The head amplifier amplifies the output signal of the optical pickup 352, i.e., the reflected light of the laser light, and outputs the amplified signal. More specifically, the signal recording/reproducing device 353 drives the not-illustrated semiconductor laser apparatus built in the optical pickup 352, so as to determine the optimum laser power by the recording and reproduction processing of the OPC pattern, along with a not-illustrated timing generator, under the control of the CPU 354, at the time of the OPC processing.

The memory 355 is used in the entire data processing and the OPC processing on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a Read Only Memory (ROM) area into which a program for performing an operation as a recording device, i.e., firmware is stored; a buffer for temporarily storing the record/reproduction data; a Random Access Memory (RAM) area into which a parameter required for the operation of the firmware program or the like is stored; and the like.

The CPU (drive control device) 354 is connected to the signal recording/reproducing device 353 and the memory 355 via the bus 357, and controls the entire information recording/reproducing apparatus 300 by giving instructions to various devices. In general, software or firmware for operating the CPU 354 is stored in the memory 355.

The data input/output control device 306 controls the data input/output from the outside with respect to the information recording/reproducing apparatus 300, and stores the data into or extracts it from a data buffer on the memory 355. A drive control command, which is issued from the external host computer 400 (hereinafter referred to as a host, as occasion demands) connected to the information recording/reproducing apparatus 300 via an interface, such as a SCSI (Small Computer System Interface) and an ATAPI (AT Attachment Packet Interface), is transmitted to the CPU 354 through the data input/output control device 306. Moreover, the record/reproduction data is also exchanged with the host computer 400 through the data input/output control device 306.

The operation/display control device 307 performs the reception of the operation instruction and display with respect to the host computer 400. The operation/display control device 307 sends the instruction of recording or reproducing by using the operation bottom 310, to the CPU 359. The CPU 359 sends a control command to the information recording/reproducing apparatus 300 through the input/output control device 308 on the basis of the instruction information from the operation/display control device 307, to thereby control the entire information recording/reproducing apparatus 300. In the same manner, the CPU 359 can send a command of requiring the information recording/reproducing apparatus 300 to send the operation condition to the host, to the information recording/reproducing apparatus 300. By this, it is possible to recognize the operation condition of the information recording/reproducing apparatus 300, such as during recording and during reproduction. Thus, the CPU 359 can output the operation condition of the information recording/reproducing apparatus 300, to the display panel 311, such as a fluorescent tube and a LCD, through the operation/display control device 307.

The memory 360 is an inner storage device used by the host computer 400, and is provided with: a ROM area into which a firmware program, such as BIOS (Basic Input/Output System), is stored; and a RAM area into which a parameter required for the operation of an operating system, an application program, or the like is stored; and the like. The memory 360 may be also connected to a not-illustrated external storage device, such as a hard disk, through the input/output control device 308.

One specific example in which the information recording/reproducing apparatus 300 and the host computer 400, as explained above, are used together is household equipment, such as recorder equipment for recording/reproducing a video. The recorder equipment records a video signal from a broadcast reception tuner and an external connection terminal, onto a disc, and outputs the video signal reproduced from the disc, to external display equipment, such as a television. The operation as the recorder equipment is performed by executing a program stored in the memory 360, on the CPU 359. Moreover, in another specific example, the information recording/reproducing apparatus 300 is a disc drive (hereinafter referred to as a drive, as occasion demands), and the host computer 400 is a personal computer or a workstation. The host computer 400, such as the personal computer, and the disc drive are connected to each other through the data input/output control devices 306 and 308, such as the SCSI and the ATAPI. An application, such as writing software, which is installed in the host computer 400, controls the disc drive.

(2) First Recording Operation Example

Figure 10:
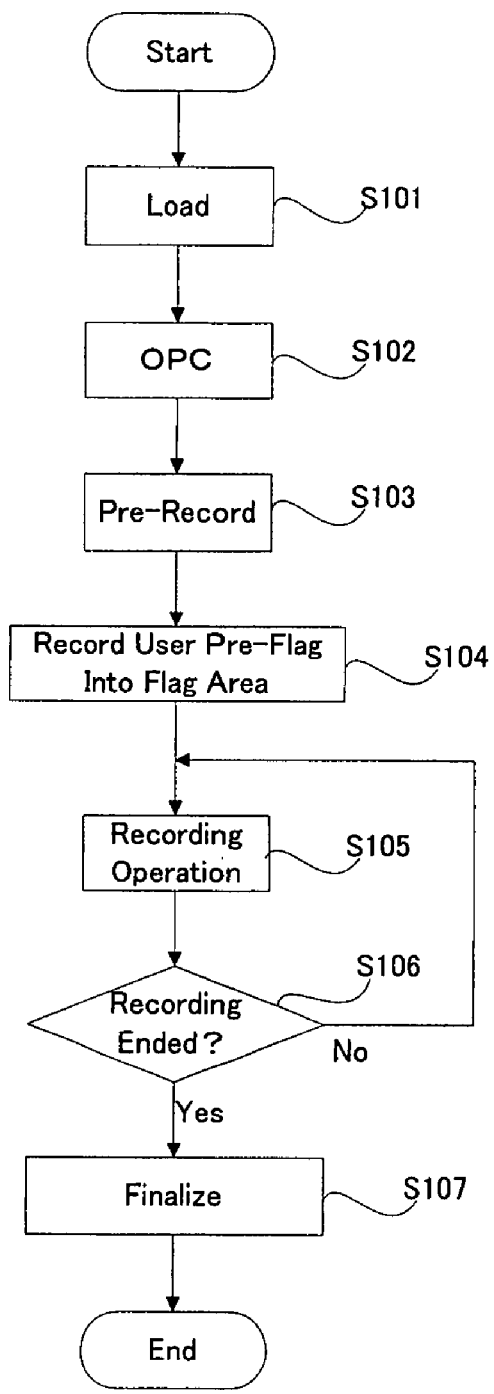
FIG. 10 is a flowchart conceptually showing an entire flow of a first recording operation of the information recording/reproducing apparatus according to the embodiment.

Next, with reference to FIG. 10, the first recording operation by the information recording/reproducing apparatus in the embodiment will be explained. FIG. 10 conceptually shows an entire flow of the first recording operation.

The first recording operation example is an aspect of the recording operation of recording the data onto the optical disc 100 shown in FIG. 2 (or the optical disc 100a shown in FIG. 3 or the optical disc 100b shown in FIG. 4). In particular, it is an aspect of the recording operation of pre-recording the pre-data into the lead-in area 104 or the like at a time (i.e. without stopping) before recording the data into the user data area 106.

As shown in FIG. 10, at first, the optical disc 100 is loaded onto the information recording/reproducing apparatus 300 (step S101).

Then, under the control of the CPU 354, the OPC processing is performed (step S102). Namely, the OPC pattern is recorded into the PCA 111, and by measuring the reproduction quality of the recorded OPC pattern, the optimum power of the laser light in recording the data is calculated.

Then, the pre-data is pre-recorded into each of the lead-in area 104 and the lead-out area 108 (step S103). More specifically, the position of each of the lead-in area 104 and the lead-out area 108 (or a recording area where the pre-data is to be recorded in each of the lead-in area 104 and the lead-out area 108) is obtained by reading the land pre-pit, and the pre-data is recorded at the position.

Then, under the control of the CPU 354, the user pre-flag is recorded into the flag area 112 (step S104). Specifically, since the pre-data is pre-recorded in each of the lead-in area 104 and the lead-out area 108 in the step S103, the user pre-flag for indicating "1" is recorded into the flag area 112. After that, video data, audio data, data for PC or the like are recorded into the user data area 106 (step S105).

Then, under the control of the CPU 354, it is judged whether or not the recording operation is ended (step S106). Namely, it is judged whether or not the recording of the data to be recorded is ended, or whether or not an instruction of stopping the recording operation is given by a user.

As a result of the judgment, if it is judged that the recoding operation is not ended (the step S106: No), the operational flow returns to the step S105, and the recording operation is continued.

On the other hand, if it is judged that the recoding operation is ended (the step S106: Yes), then, the finalize processing is performed (step S107). Specifically, the user pre-flag recorded in the flag area 112 is copied into an R information zone in the lead-in area 104, and space bitmap data or the like for indicating the distribution of the data on the optical disc 100 is recorded into an extra border zone in the lead-in area 104. Therefore, if the pre-data is pre-recorded into the lead-in area 104 in the step S103, the pre-data is not pre-recorded into the R information zone and the extra border zone.

At this time, since the pre-data is already pre-recorded in the lead-in area 104 and the lead-out area 108 in the step S103, it is unnecessary to perform the recording operation of recording the dummy data or the like (e.g. "00h" data etc.) into the lead-in area 104 and the lead-out area 108, which is originally to be performed in the finalize processing. Therefore, it is possible to greatly reduce a time required for the finalize processing.

Moreover, the user pre-flag is recorded in the flag area 112 located in the same or substantially the same recording area as a recording area into which the maker pre-flag is originally to be copied. Thus, it is unnecessary to perform a special operation and processing in the finalize processing. Namely, in the information recording/reproducing apparatus 300, it is unnecessary to distinctively treat the user pre-flag and the maker pre-flag. Thus, there is an advantage that it is possible to properly finalize the optical disc 100 even on the existing information recording/reproducing apparatus.

Incidentally, at the time of loading the optical disc in the step S101, it may be judged whether or not the pre-data is already pre-recorded in the lead-in area 104 and the lead-out area 108 of the optical disc 100. Specifically, whether or not the pre-data is already pre-recorded may be judged by referring to the user pre-flag recorded in the flag area 121 in the RMA 112. For example, if the user pre-flag indicates "0", it is judged that the pre-recording is not performed yet. On the other hand, if the user pre-flag indicates "1", it is judged that the pre-recording is already performed. If it is judged that the pre-recording is already performed, the pre-recording in the step S103 may not be performed. Alternatively, if the optical disc 100 is loaded onto the information recording/reproducing apparatus 300 for the first time, it may be judged that the pre-recording is not performed yet, because the user pre-flag is not recorded in the flag area 121. If it is judged that the pre-recording is not performed yet, the pre-recording in the step S103 may be performed.

Moreover, in addition to, or before, or in place of referring to the flag area 121 in the RMA 112, the maker pre-flag recorded in the control data zone 113 may be referred to. Namely, it may be judged whether or not the pre-data is pre-recorded in the lead-in area 104 and the lead-out area 108 by the manufacture of the optical disc 100. If it is judged that the pre-data is pre-recorded in the lead-in area 104 etc. by the manufacture of the optical disc 100 (i.e. if the maker pre-flag indicates "1", for example), the maker pre-flag may be copied into the flag area 121 in the RMA 112 after the OPC processing. On the other hand, if it is judged that the pre-data is not pre-recorded yet in the lead-in area 104 etc. by the manufacture of the optical disc 100 (i.e. if the maker pre-flag indicates "0", for example), the pre-recording in the step S103 (i.e. the pre-recording by a user) may be performed.

(3) Second Recording Operation Example

Figure 11:
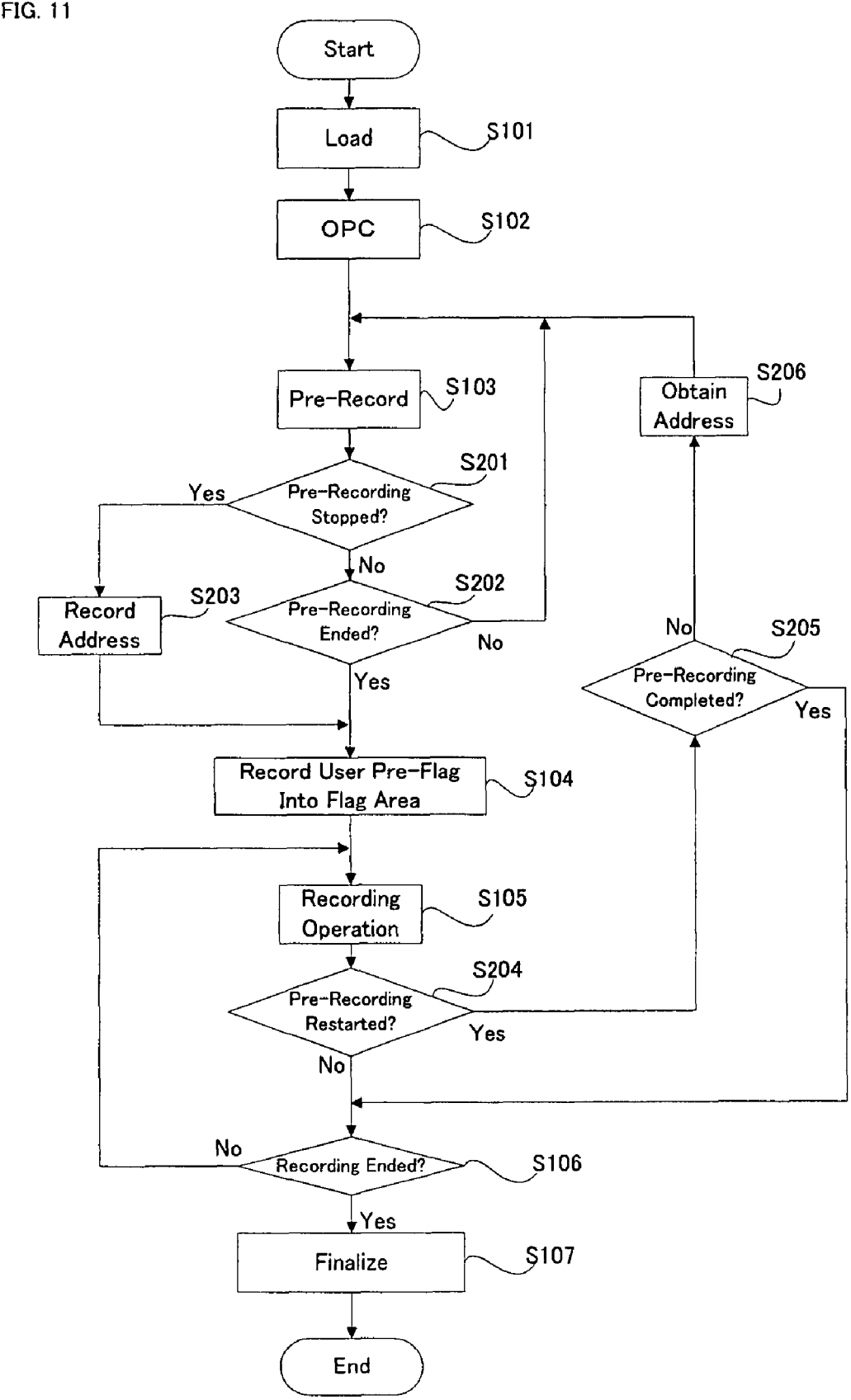
FIG. 11 is a flowchart conceptually showing an entire flow of a second recording operation of the information recording/reproducing apparatus according to the embodiment.
Figure 12:
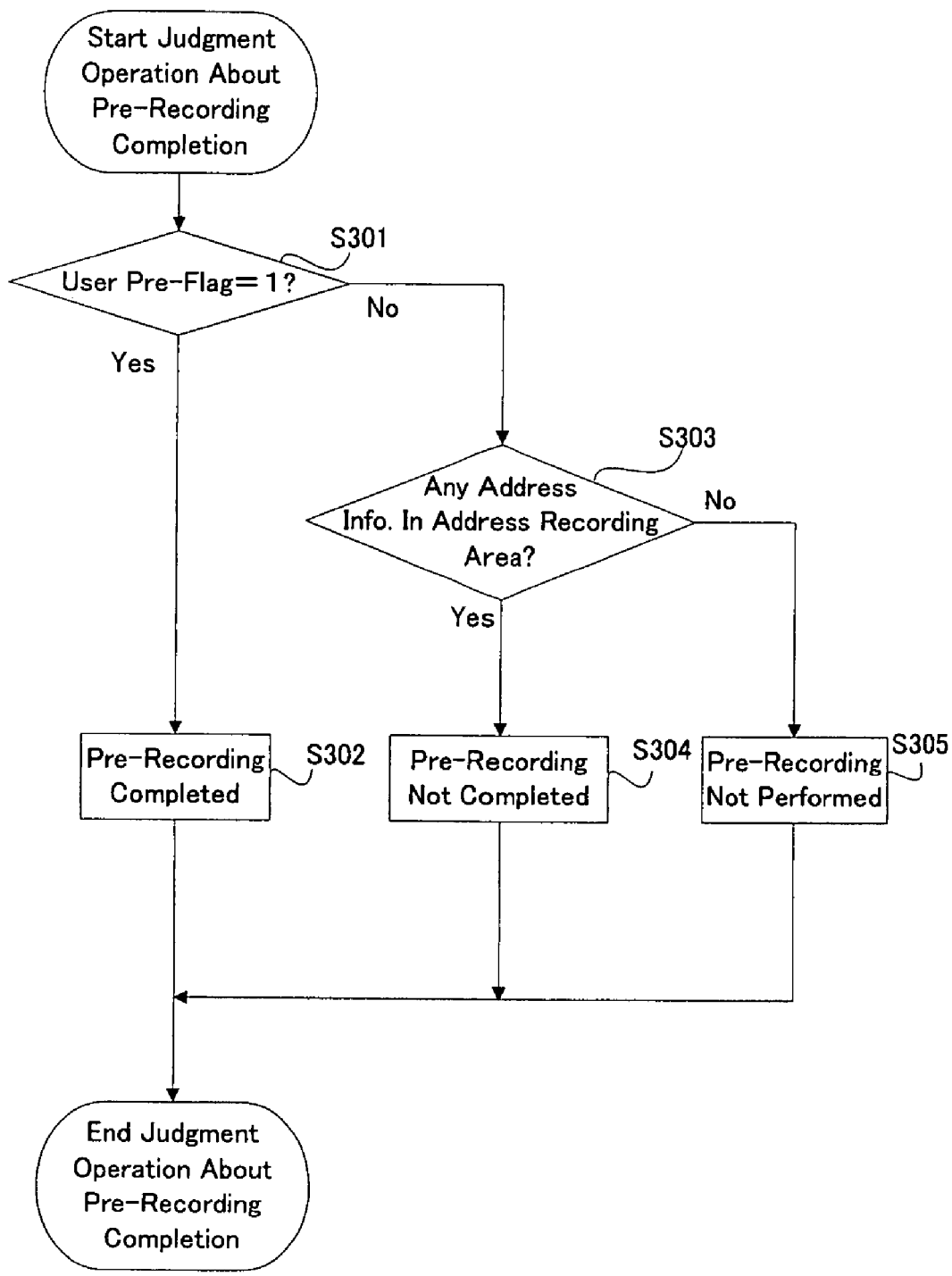
FIG. 12 is a flowchart conceptually showing a flow of an operation of judging whether or not pre-data is pre-recorded, in the information recording/reproducing apparatus according to the embodiment.
Figure 14:
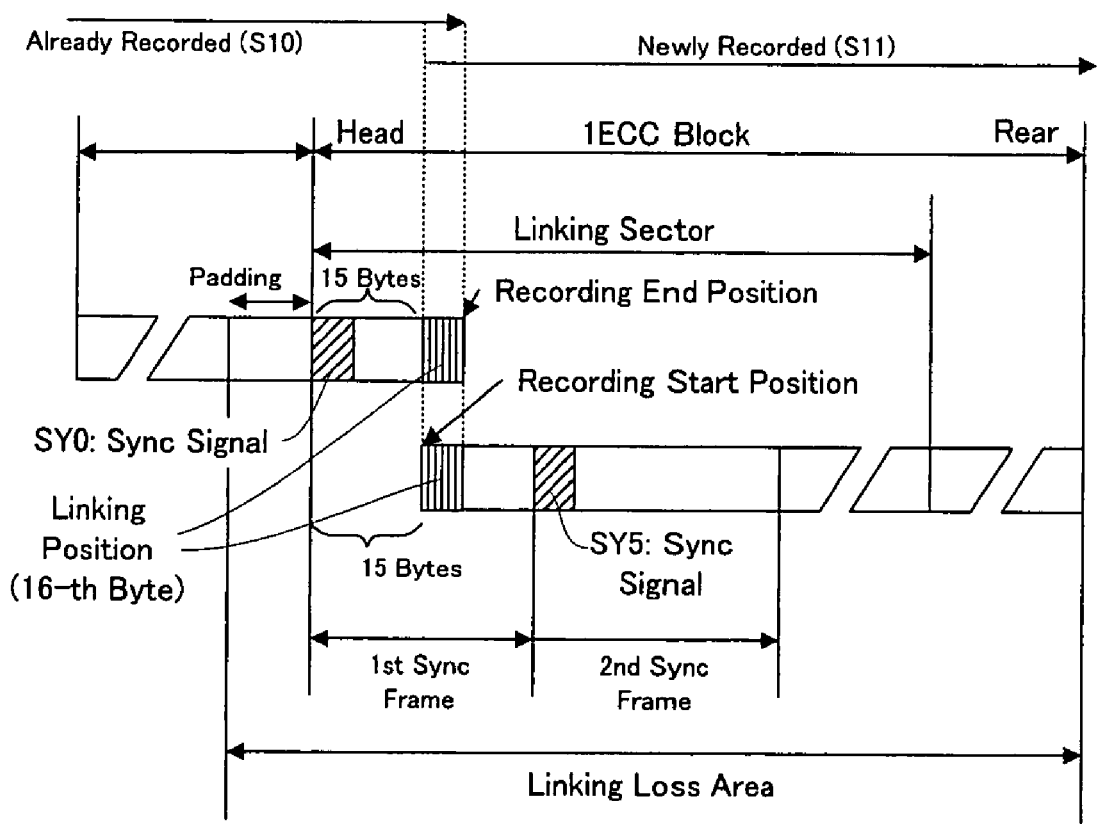
FIG. 14 is a data structure diagram conceptually showing an aspect of additional or postscript recording of the pre-information in the second recording operation.

Next, with reference to FIG. 11 to FIG. 14, the second recording operation by the information recording / reproducing apparatus in the embodiment will be explained. FIG. 11 conceptually shows an entire flow of the second recording operation. FIG. 12 conceptually shows a flow of an operation of judging whether or not pre-data is pre-recorded, in the information recording / reproducing apparatus according to the embodiment. FIGS. 13A-13C conceptually show the state of the pre-recording of pre-information in the second recording operation. FIG. 14 conceptually shows an aspect of additional or postscript recording of the pre-information in the second recording operation.

Incidentally, the second recording operation example is an aspect of the recording operation in which the pre-recording of the pre-data into the lead-in area 104 and the lead-out area 108 (or the middle area 109) of the optical disc 100*c* is stopped in the middle before the completion of the pre-recording. The operation in common with the above-mentioned first operation example carries the same step number, and the detailed explanation thereof will be omitted.

As shown in FIG. 11, at first, the optical disc 100*c* is loaded onto the information recording/reproducing apparatus 300 (the step S101).

Then, the OPC processing is performed, under the control of the CPU 354 (the step S102). Then, the pre-data is pre-recorded into each of the lead-in area 104 and the lead-out area 108 (the step S103).

During the pre-recording of the pre-data, it is judged whether or not the pre-recording is stopped (step S201). For example, it is judged whether or not an instruction of recording the video data, the audio data, the data for PC or the like into the user data area 104, is given by a user or the command of the CPU 354 or 359.

As a result of the judgment, if it is judged that the pre-recording is not stopped (the step S201: No), then, it is judged whether or not the pre-recording is ended (step S202). Specifically, it is judged whether or not the pre-data is pre-recorded into the lead-in area 104 and the lead-out area 108 (specifically, the entire recording area in which the pre-data is to be recorded in each of the lead-in area 104 and the lead-out area 108).

As a result of the judgment in the step S202, if it is judged that the pre-recording is not ended (the step S202: No), the operational flow returns to the step S103 again, and the pre-recording of the pre-data is continued. On the other hand, if it is judged that the pre-recording is ended (the step S202: Yes), then, under the control of the CPU 354, the user pre-flag is recorded into the flag area 112 (the step S104).

On the other hand, as a result of the judgment in the step S201, if it is judged that the pre-recording is stopped (the step S201: Yes), the address information of the end-edge portion of the recording area in which the pre-data is already pre-recorded (i.e. the address information for indicating the position of the recording area in which the pre-recording is stopped) is recorded into the address recording area 122 (step S203). In other words, when the recording of the pre-data is stopped, the address information or the like of the recording area in which the pre-data is finally recorded is recorded. Then, under the control of the CPU 354, the user pre-flag is recorded into the flag area 112 (the step S104). Specifically, since the pre-recording of the pre-data is stopped in the step S201 and the pre-recording is not completed, the user pre-flag for indicating "0" is recorded into the flag area 112.

Then, the video data, the audio data, the data for PC or the like is recorded into the user data area 106 (the step S105).

Then, under the control of the CPU 354, it is judged whether or not the pre-recording of the pre-data is restarted (step S204). For example, in the case that the pre-recording is stopped in the step S201 in order to record the video data of a predetermined size into the user data area 106, if the recording of the video data of the predetermined size is completed, it may be judged that the pre-recording is restarted. Alternatively, if there is no instruction of recording the video data, the audio data, the data for PC or the like into the user data area 106, it may be judged that the pre-recording is restarted.

As a result of the judgment, if it is judged that the pre-recording of the pre-data is restarted (the step S204: Yes), then, it is judged whether or not the pre-recording is completed (step S205). It is judged not only whether or not the pre-data is recorded in the lead-in area 104 and the lead-out area 108, but also whether or not the pre-data is recorded in the entire recoding area in which the pre-data is to be recorded out of the lead-in area 104 and the lead-out area 108. This judgment operation will be explained in more detail with reference to FIG. 12.

As shown in FIG. 12, at first, under the control of the CPU 354, the user pre-flag recorded in the flag area 121 in the RMA 112 is referred to and it is judged whether or not the value of the user pre-flag is "1" (step S301).

As a result of the judgment, if it is judged that the user pre-flag is "1" (the step S301: Yes), it is judged that the pre-recording of the pre-data is completed (step S302). Namely, only when the pre-recording is ended in the step S202 of FIG. 11, the user pre-flag for indicating "1" is recorded in the flag area 112. Thus, if the user pre-flag indicates "1", it is judged that the pre-recording is ended (i.e. completed).

On the other hand, if it is judged that the user pre-flag is not "1" (i.e. the user flag is "0") (the step S301: No), then, it is judged whether or not the address information is recorded in the address recording area 122 (step S303).

As a result of the judgment, if it is judged that the address information is recorded in the address recording area 122 (the step S303: Yes), it is judged that the pre-recording is not completed (step S304). Namely, in this case, since the address information or the like for indicating the position of the recording area in which the pre-recording is stopped is recorded in the address recording area 122, it is possible to judge that the pre-recording is not completed at least at that time point as long as the address information is recorded.

Incidentally, as described above, if the pre-recording of the pre-data is completed, the sector number of "000000h" or the sector number of the most outer circumferential portion of the recording area in which the pre-data is to be recorded is recorded as the address information, for example. Therefore, if the address information shown by these sector numbers or the like is recorded, it is preferably judged that the pre-recording is completed. However, if the these sector numbers or the like are recorded, the user pre-flag in the flag area 121 is "1", so that the address information shown by these sector numbers or the like is not referred to in the step S303, normally.

On the other hand, if it is judged that the address information is not recorded in the address recording area 122 (the step S303: No), it is judged that the pre-recording of the pre-data is not performed yet (step S305). Specifically, if the pre-recording of the pre-data is started even once, the address information or the like for indicating the position of the recording area in which the pre-recording is stopped or the address information for indicating the completion of the pre-recording (i.e. the sector number of "000000h" or the sector number of the most outer circumferential portion of the recording area in which the pre-data is to be recorded, or the like) is recorded in the address recording area 122. Thus, the fact that the address information is not recorded means that the pre-recording of the pre-data is not performed even once, with respect to the currently loaded optical disc 100c.

In FIG. 11 again, as a result of the judgment in the step S205, if it is judged that the pre-recording is completed (the step S205: Yes), the pre-recording of the pre-data cannot be performed any more, so that the operational flow returns to the step S106, and it is judged whether or not the recording operation is ended.

On the other hand, as a result of the judgment in the step S205, if it is judged that the pre-recording is not completed (or not performed yet) (the step S205: No), then, the address information of the recording position in which the pre-data is to be recorded is obtained (step S206). Specifically, the address recording area 122 is referred to, to thereby obtain the address information recorded therein. Then, the operational flow returns to the step S103, and the pre-recording of the pre-data is restarted from the recording position indicated by the address information obtained in the step S206.

Incidentally, even if the address information is not obtained again in the step S206, the address information may be obtained in advance in the judgment operation in the step S303 of FIG. 12. If it is judged that the pre-recording is not performed yet, the address information cannot be obtained in the step S206, so that the operation of obtaining the address information may be not performed.

On the other hand, as a result of the judgment in the step S204, if it is judged that the pre-recording is not restarted (the step S204: No), then, under the control of the CPU 354, it is judged whether or not the recording operation is ended (the step S106). If it is judged that the recording operation is not ended (the step S106: No), the recording operation is continued. If it is judged that the recording operation is ended (the step S106: Yes), the finalize processing is performed (step S108).

In the finalize processing, if the pre-recording is not completed (or not ended) in the step S104, the dummy data or the like is recorded into an area portion in which the pre-data is not recorded out of the lead-in area 104 and the lead-out area 108.

As described above, in the step S103 of FIG. 11, the pre-data is pre-recorded in the lead-in area 104 and the lead-out area 108 (or one portion thereof). Therefore, as compared to the case that the pre-data is not pre-recorded, it is possible to reduce a time required for the finalize processing, to thereby realize the efficient recording operation. Therefore, it is possible to receive the same benefits as those in the first recording operation example.

In particular, in the second operation example, the pre-recording of the pre-data can be stopped, so that it is possible to flexibly perform the recording operation in accordance with the state at that time. As a result, it is possible to realize the recording operation, more efficiently. Moreover, since the address information for indicating the recording position where the pre-recording is stopped is recorded in the address recording area 122, it is possible to restart the pre-recording, quickly and preferably, by referring to the address information.

Now, the stop operation and the restart operation of the pre-recording of the pre-data will be explained with reference to an actual data structure shown in FIG. 13A to FIG. 13C.

As shown in FIG. 13A, it is assumed that the pre-data is recorded until a recording position with a sector number of "A" before the pre-recording is stopped. At this time, the address information recorded in the step S203 of FIG. 11 has the sector number of "A", and the user pre-flag recorded in the step S104 of FIG. 11 is "0". Therefore, even in the judgment operation in the step S205 of FIG. 11, it is judged that the pre-recording is not completed.

Then, it is assumed that the pre-recording is restarted, and the pre-data is recorded until a recording position with a sector number of "B" as shown in FIG. 13B, before the pre-recording is stopped. At this time, the address information recorded in the step S203 of FIG. 11 has the sector number of "B", and the user pre-flag recorded in the step S104 of FIG. 11 is "0". Therefore, even in the judgment operation in the step S205 of FIG. 11, it is judged that the pre-recording is not completed.

Then, it is assumed that the pre-recording is restarted, and the pre-data is recorded until a recording position with a sector number of "C" (i.e. the position of the end portion of the recording area in which the pre-data is to be recorded out of the lead-in area 104), as shown in FIG. 13C. At this time, the address information recorded in the step S203 of FIG. 11 has the sector number of "C" or the sector number of "000000h", and the user pre-flag recorded in the step S104 of FIG. 11 is "1". Therefore, in the judgment operation in the step S205 of FIG. 11, it is judged that the pre-recording is completed.

As described above, in the second operation example, the pre-recording is stopped, as occasion demands, and the user pre-flag is recorded into the flag area 121, and the address information is recorded into the address recording area 122.

With reference to FIG. 14, one specific example of the link of a linking position in the sector will be explained in detail. Incidentally, one specific example of the link will be explained in the case that the pre-data is pre-recorded again, following the recording position where the pre-recording is stopped.

As shown in FIG. 14, if the pre-data is newly pre-recorded (or additionally recorded) in the rear of the recording area in which the pre-data is already recorded, linking (or overwriting) is performed in the linking position in the sector. More specifically, it is assumed that the pre-recording is already performed from "0" byte to "16" byte of a first sync frame out of 26 sync frames in a linking sector, for example, which is located in the head of 1 ECC block (16 sectors) which is mostly an unrecorded area and in which the pre-recording is newly performed. If the pre-recording is newly performed, the additional recording is started from the "16" byte between "15" byte and "17" byte of the first sync frame of the linking sector, for example.

As described above, the "16" byte of the first sync frame of the linking sector which is located in the head of 1 ECC block is an area in which overwriting is performed by newly pre-recording, and it is referred to as the linking position. More specifically, for example, the linking sector having an information amount of 2 KB is provided with 26 sync frames, and each sync frame is provided with: a sync signal part of "32" channel bits; and a data part of "1488" channel bits. There are eight types of sync signals, such as "SY0" and "SY5" in FIG. 14. A unique pair of sync frames can be specified by combining two of the sync signals. Thus, the information recording/reproducing apparatus 300 can control at which position in one sector the pre-recording is performed.

(4) Third Recording Operation Example

Figure 15:
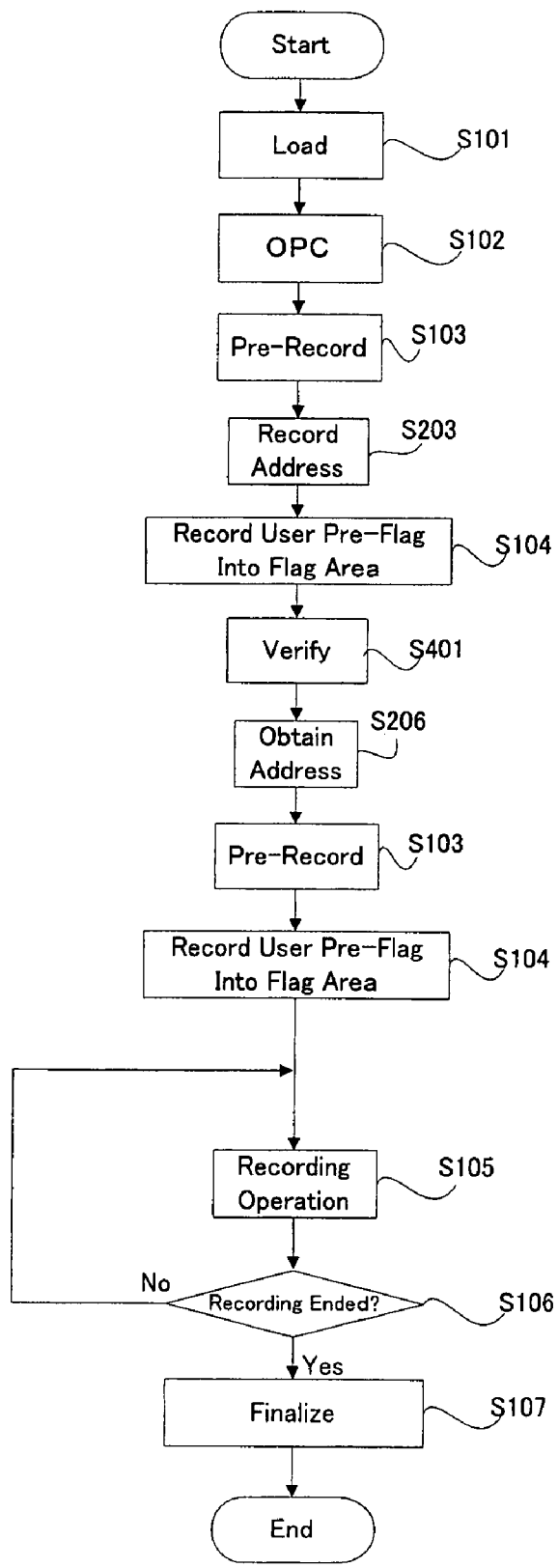
FIG. 15 is a flowchart conceptually showing an entire flow of a third recording operation of the information recording/reproducing apparatus according to the embodiment.

Next, with reference to FIG. 15, the third recording operation example by the information recording/reproducing apparatus in the embodiment will be explained. FIG. 15 conceptually shows an entire flow of the third recording operation.

Incidentally, in the third recording operation example, the reproduction quality on the optical disc 100 is inspected, or the initial setting of the information recording/reproducing apparatus is performed, or the like, by verifying the pre-recorded pre-data in the pre-recording of the pre-data into the lead-in area 104, the lead-out area 108, and the middle area 109.

As shown in FIG. 15, at first, the optical disc 100c is loaded onto the information recording/reproducing apparatus 300 (the step S101).

Then, under the control of the CPU 354, the OPC processing is performed (the step S102). Then, the pre-data is pre-recorded into each of the lead-in area 104 and the lead-out area 108 (step S103). At this time, the pre-data having the size of several ECC blocks is pre-recorded, for example. Then, the pre-recording is stopped, and the address information of the end-edge portion of the recording area in which the pre-data is already pre-recorded (i.e. the address information or the like for indicating the position of the recording area where the pre-recording is stopped) is recorded into the address recording area 122 (the step S203). In addition, under the control of the CPU 354, the user pre-flag is recorded into the flag area 112 (the step S104). Since the pre-recording is not ended here, "0" is recorded as the user pre-flag.

Then, the pre-recorded pre-data is verified (step S401). For example, the reproduction quality of the pre-recorded pre-data (e.g. asymmetry, a jitter value, modulated amplitude, or the like) is measured. Then, on the basis of the measurement result, the power and waveform of the laser light irradiated by the optical pickup 352 may be adjusted, as occasion demands, or various servo circuits may be adjusted. Alternatively, parameters or the like about the recording operation may be adjusted. If it is judged by the measurement result that the quality of the optical disc 100c is bad, the optical disc 100c may be regarded as a defective, and may not be used in the subsequent recording operation.

Then, the address information of the recording position in which the pre-data is to be recorded is obtained in order to restart the pre-recording after the verifying (the step S206). Then, the pre-recording of the pre-data is restarted from the recording position indicated by the address information obtained in the step S206 (the step S103). After the pre-recording is completed, under the control of the CPU 354, the user pre-flag is recorded into the flag area 112 (the step S104). Since the pre-recording is ended here, "1" is recorded as the user pre-flag.

Then, the video data, the audio data, the data for PC or the like are recorded into the user data area 106 (the step S105). Then, under the control of the CPU 354, it is judged whether or not the recording operation is ended (the step S106). Then, if it is judged that the recoding operation is not ended (the step S106: No), the recording operation is continued. If it is judged that the recoding operation is ended (the step S106: Yes), then, the finalize processing is performed (the step S107).

As a result, as in the above-mentioned first recording operation example and second recording operation example, it is possible to reduce a time required for the finalize processing, to thereby realize the efficient recording operation.

In particular, in the third recording operation example, the pre-data having the size of several ECC blocks is firstly pre-recorded, and then, the verify operation is performed by using the pre-recorded pre-data. Thus, it is possible to realize the recording operation, more preferably.

In the above-mentioned embodiment, the optical disc 100 is explained as one example of the information recording medium, and the recorder related to the optical disc 100 is explained as one example of the information recording apparatus. The present invention, however, is not limited to the optical disc and the recorder thereof, and can be applied to various information recording media, such as a high-density recording medium or a high transfer rate recording medium, and recorders thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

INDUSTRIAL APPLICABILITY

The information recording medium, information recording apparatus and method, and the computer program according to the present invention can be applied to a high-density information recording medium such as a DVD and further applied to an information recording apparatus such as a DVD recorder. Moreover, they can be applied to an information recording apparatus or the like which is mounted on various computer equipment for consumer use or for commercial use, or which can be connected to various computer equipment.

The invention claimed is:

1. An information recording medium for recording record information comprising:
    a record information area to record therein the record information;
    an edge portion area adjacent to at least one edge portion of said record information area;
    a flag area in which a pre-record flag for indicating whether or not management data or dummy data is pre-recorded in at least one portion of said edge portion area in manufacturing said information recording medium is recorded; and
    a recording management area to record therein management information for managing a recording operation in recording the record information,
    said recording management area including an area for replicating the pre-record flag.

2. The information recording medium according to claim 1, wherein said flag area is disposed in a control data zone, in which control information for controlling at least one of recording operation and reproducing operation, in a lead-in area.

3. The information recording medium according to claim 1, further comprising a position information area to record therein position information for indicating a position of an area portion of said edge portion area in which the management data or dummy data is already pre-recorded.

4. The information recording medium according to claim 1, further comprising a position information area to record therein position information for indicating a position of an end-edge portion of an area portion of said edge portion area in which the management data or dummy data is already pre-recorded.

5. The information recording medium according to claim 1, wherein said edge portion area is at least one of a lead-in area, a lead-out area, and a middle area, each of which is located in the at least one edge portion.

6. The information recording medium according to claim 1, wherein
    said information recording medium has a plurality of recording layers, each of which comprises said recording information area and said edge portion area, and
    said flag area is provided for at least one of the plurality of recording layers.

7. An information recording apparatus for recording record information onto an information recording medium for recording the record information comprising: a record information area to record therein the record information; an edge portion area adjacent to at least one edge portion of said record information area; a flag area in which a pre-record flag for indicating whether or not management data or dummy data is pre-recorded in at least one portion of said edge portion area in manufacturing said information recording medium is recorded; and a recording management area to record therein management information for managing a recording operation in recording the record information,
    said information recording apparatus comprising:
    a reading device for reading the pre-record flag recorded in the flag area;
    a recording device for recording predetermined information into at least one portion of the edge portion area on the basis of the pre-record flag; and
    a replicating device for replicating the pre-record flag in the recording management area.

8. An information recording method of recording record information onto an information recording medium for recording the record information comprising: a record information area to record therein the record information; an edge portion area adjacent to at least one edge portion of said record information area; a flag area in which a pre-record flag for indicating whether or not management data or dummy data is pre-recorded in at least one portion of said edge portion area in manufacturing said information recording medium is recorded; and a recording management area to record therein management information for managing a recording operation in recording the record information,
    said information recording method comprising:
    a reading process of reading the pre-record flag recorded in the flag area;
    a recording process of recording predetermined information into at least one portion of the edge portion area on the basis of the pre-record flag; and
    replicating process of replicating the pre-record flag in the recording management area.

* * * * *